United States Patent [19]

Boshinski

[11] Patent Number: 4,543,766
[45] Date of Patent: Oct. 1, 1985

[54] PACKAGING SYSTEM
[75] Inventor: Edwin E. Boshinski, Englewood, Ohio
[73] Assignee: Hobart Corporation, Troy, Ohio
[21] Appl. No.: 469,328
[22] Filed: Feb. 24, 1983
[51] Int. Cl.⁴ .................... B65B 57/10; B65B 59/02
[52] U.S. Cl. ............................. 53/64; 53/502; 53/504; 53/131; 53/137; 53/556; 177/4; 177/165
[58] Field of Search ............ 53/502, 504, 131, 137, 53/64, 66, 556; 177/165, 4; 346/9; 73/865 G; 33/494, 1 F; 156/385, 386

[56] References Cited

U.S. PATENT DOCUMENTS

| | | | |
|---|---|---|---|
| 1,254,952 | 1/1918 | Waterbury | 33/1 F |
| 3,029,571 | 4/1962 | Douthit . | |
| 3,194,710 | 7/1965 | Stremke et al. | 53/131 |
| 3,453,167 | 7/1969 | Arvidson et al. | 53/502 |
| 3,540,187 | 11/1970 | Monaghan | 53/66 |
| 3,578,525 | 5/1971 | Mueller | 156/385 |
| 3,662,513 | 5/1972 | Fabbri . | |
| 3,748,812 | 7/1973 | Burn | 53/66 |
| 3,872,644 | 3/1975 | Giraudi et al. | 53/504 |
| 3,878,909 | 4/1975 | Treiber . | |
| 3,967,433 | 7/1976 | Bonfiglioli . | |
| 4,075,815 | 2/1978 | Carver, Jr. et al. . | |
| 4,134,246 | 1/1979 | Michels . | |
| 4,180,962 | 1/1980 | Michels . | |
| 4,205,501 | 6/1980 | Michels . | |
| 4,390,390 | 6/1983 | Margraf et al. | 53/137 |
| 4,415,048 | 11/1983 | Teraoka . | |
| 4,458,470 | 7/1984 | Fine | 53/502 |

FOREIGN PATENT DOCUMENTS 911273  11/1962  United Kingdom .................. 53/66

OTHER PUBLICATIONS

Weldotron Automac Stretch Packaging Systems, Brochure on Weldotron Models A/12/A12ST, A44ST and A40, Piscataway, New Jersey.
Weldotron Weighwrap System 5012, Brochure from Weldotron Corp., Piscataway, New Jersey.
Supermarket Business, vol. 36, No. 2, 2/81.
Automac, Brochure on Model 24, Costruzioni Macchine Automatiche S.p.A., Italy, Nov. 1982.
Bizerba-Waldyssa/Automac, Bizerba Waagen Katalog, Nov., 1982.

Primary Examiner—Daniel C. Crane
Attorney, Agent, or Firm—Biebel, French & Nauman

[57] ABSTRACT

A weighing scale and a label printer/applier are cooperatively combined with a wrapping machine to form a packaging machine into which a trayed commodity can be inserted and a wrapped and priced package removed. The weight of a trayed commodity is preferably determined as it is transported into the packaging machine. The tray size, known commodity and weight of the trayed commodity or package are utilized to determine the length and width of a sheet of film to be used to wrap the package. The package weight is passed to a label printer which calculates the price for the commodity being packaged, prints the label and passes it to a labeling head incorporated into a portion of the wrapping machine.

7 Claims, 21 Drawing Figures

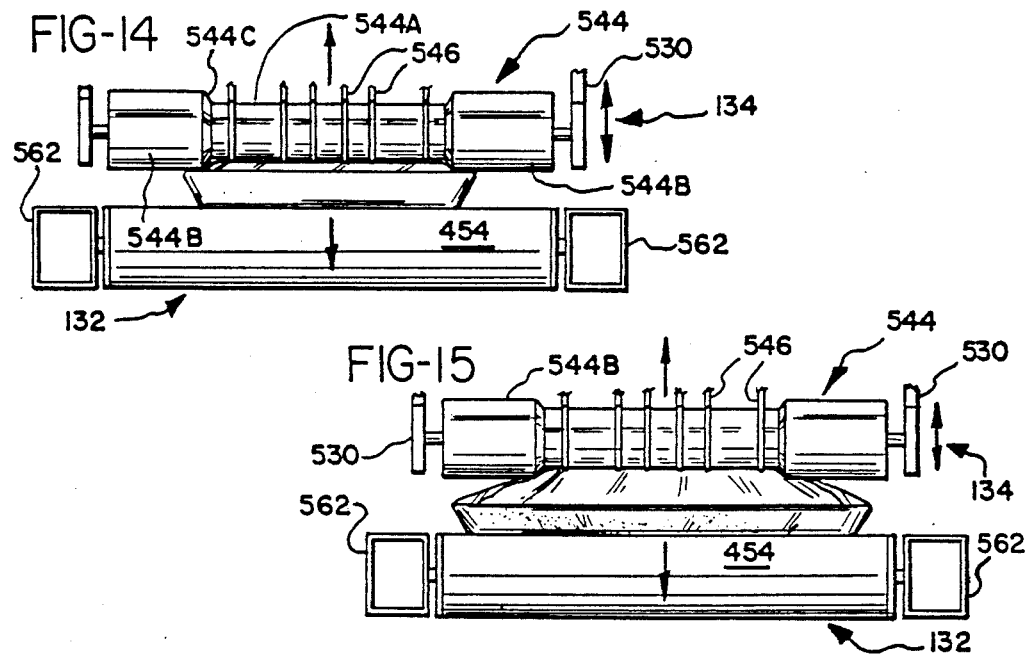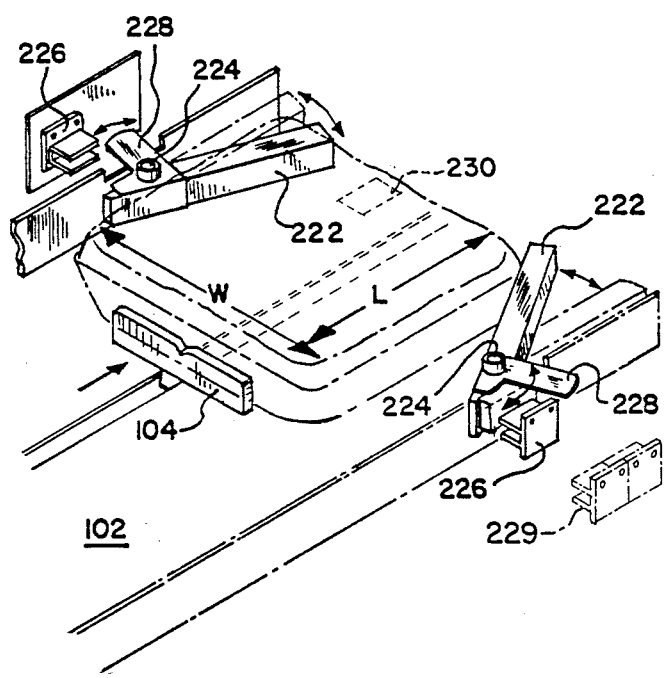

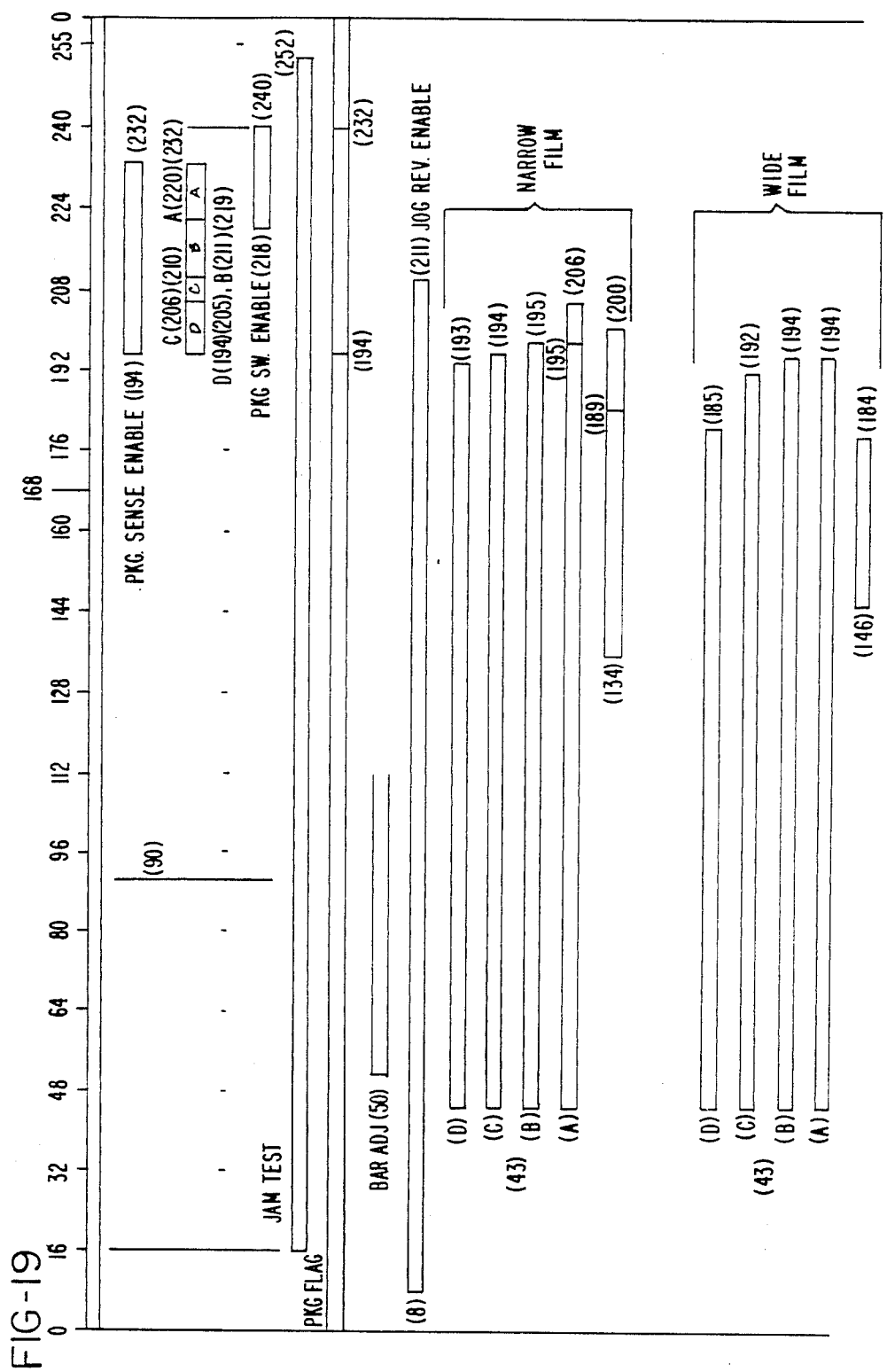

FIG-21

| TRAY SIZE | 1S 5x5x5/8 | 2S 8x5 1/2x5/8 | | | 4S 9x7x5/8 | | | 17S 8x4 1/2x5/8 * | 20S 8 3/4x6 1/4x5/8 | | | 1 5x5x1 | 2d 8x5x1/2x1 | | |
|---|---|---|---|---|---|---|---|---|---|---|---|---|---|---|---|
| LBS | 1 | 1 | 2 | 4 | 1 | 2 | 4 | 1 | 1 | 2 | 4 | 1 | 1 | 2 | 4 |
| FILM LENGTH | A | B | B | C | B | B | C | A | B | B | C | A | B | B | C |

*USE WIDE FILM

| TRAY SIZE | 8S 10x8x5/8 | 10S 10 1/2x5 1/2x5/8 | | | 12S 11x9x5/8 | 16S 12x7x5/8 | | | 5 10x5x1 | | | 10K 10 7/6x6 3/4x2 | | |
|---|---|---|---|---|---|---|---|---|---|---|---|---|---|---|
| LBS | 1 | 1 | 3 | 5 | 1 | 1 | 3 | 5 | 1 | 3 | 5 | 1 | 3 | 5 |
| FILM LENGTH | D | B | B | C | D | C | C | D | B | B | C | B | B | C |

PACKAGING SYSTEM

BACKGROUND OF THE INVENTION

This invention relates generally to systems utilizing film to package articles contained in trays and, more particularly, to a system wherein a wrapping machine, a weighing scale and a labeler interact and cooperate with one another to produce a compact, high efficiency packaging system.

A variety of film wrapping machines are known in the prior art. In modern wrapping machines, multiple film widths and lengths may be used to wrap trayed commodities. For example, one commercially available machine includes a sensing system which determines the length and the width of a trayed commodity to be wrapped. Based on the sensed length and width characteristics, the wrapping machine selects one of two differing width film rolls and the length of the film sheet drawn from the selected roll. While this wrapping machine is an improvement over earlier machines which utilize a fixed length of a single width film to wrap all packages regardless of size, the use of the length and the width of a tray alone to select the film sheet size does not permit an optimal sized sheet of material to be drawn.

Computing weighing scales and labelers which print and apply price labels to packages as well as combinations of the two are also known in the art. A computer or other electronic means is included within the scale or labeler for calculating the price for the packaged commodity. The price is calculated by effectively multiplying the net weight of the packaged commodity times the commodity price per unit weight which is stored into a memory of the computer. Commodity net weight is determined by compensating for the tare weight or weight of the packaging material.

In the prior art, tare weight compensation has been performed by zeroing the scale while an exemplar of the packaging material is on the scale weighing platform. The exemplar can be a tray alone, if the trayed commodity is weighed before wrapping, or a tray and sheet of film if weighed after wrapping.

Alternately, in some packaging systems, the expected tare weight is stored together with the identification of the commodity and the price per unit weight of the commodity. The expected tare weight is based on the packaging material which is ordinarily used to package the particular commodity such as a tray size and diaper. Thus, the package is weighed to obtain a gross weight and the stored tare weight for the given commodity is subtracted from the gross weight by the computer. The net weight thus determined, coupled with the price per unit weight, determines the price to be charged for the package.

The typical operation of a prior art packaging system is to initially place a commodity to be packaged onto a supporting tray. The trayed commodity is then fed into a wrapping machine where a sheet of film is wrapped about it and secured beneath the tray to complete a package. The package is then conveyed either mechanically or manually to a combination computing weighing scale and labeler. At the scale/labeler station, the price of the package is computed, a price label is printed and the label is applied to the package.

In order to conserve space, a commercially available packaging system has been developed which combines a weighing scale, a wrapping machine and a label printer into a single unit. Even though these machines are combined into a single, relatively compact unit, there is no cooperative interaction between the individual machines. That is to say, each of the machines performs its standard function: the scale weighs the package, the wrapping machine wraps the package and the label printer prints a label in response to weight signals generated by the scale. Furthermore, since label generation/application is downstream from the wrapping operation, label information must be stored and delayed so that labels correctly correspond with wrapped packages. Such information storage and delay lead to problems in restarting the system when the system is stopped due to operating problems.

It is, thus, apparent that while wrapping machines, computing weighing scales and label printers/appliers are available and have been packaged in various combinations, the functions and characteristics of the individual units have not been interrelated one to another to arrive at a cooperative, integrated packaging system.

SUMMARY OF THE INVENTION

In accordance with the present invention, a weighing scale and a label printer/applier are cooperatively combined with a wrapping machine to form a packaging machine into which a trayed commodity can be inserted and an attractively wrapped and priced package removed. The weight of a trayed commodity is determined as the commodity is transported into the packaging machine. The tray size, known commodity and weight of the trayed commodity or package are utilized to determine the length and width of a sheet of film to be used to wrap the package. The package weight is passed to a label printer which calculates the price for the commodity being packaged, prints the label and passes it to a labeling head incorporated into a portion of the wrapping machine. Since the tray size being used for a given commodity is preferably determined during the packaging process by sensing the tray, the labeler can verify the tare weight being used to calculate the price and therefore help to ensure that both the consumer and the packaging system user are being treated fairly upon the sale of the packaged commodity.

The packaging machine performs a method for selecting the size of a sheet of wrapping material to be used for wrapping a known commodity supported upon a tray comprising the steps of: transporting the trayed commodity toward a wrapping station; determining the base dimensions of the tray; determining the weight of the trayed commodity to ascertain whether it weighs more than a predetermined weight which corresponds to a defined height of the known commodity supported upon a tray having the determined base dimensions; providing a continuous supply of wrapping material wider than the trayed commodity with a leading edge positioned at a defined material drawing location; and drawing the leading edge of the wrapping material to a first location determined in accordance with the tray base dimensions if the weight of the trayed commodity does not exceed the predetermined weight, and to a second location a defined distance beyond the first location if the weight of the package exceeds the predetermined weight. The weight, in essence, becomes an indication of the height of the known commodity supported upon a given size tray.

Trays entering the packaging machine preferably have their dimensions, i.e., their length and width, measured as they are transported to a wrapping position. Two film widths can be provided with one width for wrapping narrow packages which are also low, i.e., have a weight below the predetermined weight, and the other of a greater width for wrapping wide packages and selected narrow packages which are also high, i.e., have a weight which exceeds the predetermined weight.

The packaging machine can include a label generator which calculates the price to be charged for each package based upon the unit price and the measured weight. The label generator prints a label indicative of the calculated price which label is transported to a position where it may be applied during the film wrapping operation. In the preferred embodiment of the present invention, the wrapping machine comprises an elevator wrapping machine wherein each trayed commodity to be wrapped is elevated into a prestretched section of film. In the preferred embodiment, the price labels are conveyed to a package holddown positioned above the elevator such that the price label is applied to the upper surface of a film sheet as the trayed commodity to be wrapped is elevated into the film sheet.

Since the label generating apparatus must calculate the price to be charged for each package and that calculation must exclude the tare weight or the weight of the wrapping materials used to wrap the package, the tare weight can be selected in the label generating apparatus in correspondence with the tray dimensions to more accurately reflect the tare weight for each given package.

It is, therefore, an object of the present invention to provide an improved packaging system wherein the length and width of a section of film to be used to wrap a trayed commodity is determined in accordance with the dimensions of the tray, the weight of the trayed commodity and the known commodity being wrapped.

It is another object of the present invention to provide an improved packaging machine wherein a package is weighed as it is transported to a wrapping station with the length of film to be used to wrap the package being selected in accordance with the package characteristics including the package weight and wherein a pricing label generated in response to the weight of the package and the known commodity unit price is applied during the wrapping operation.

It is yet another object of the present invention to provide an improved packaging system wherein the weight of a trayed commodity is used to determine not only the price to be charged for the commodity, but also the film length to be used to wrap the commodity with a price label being generated and applied during wrapping wherein label generating apparatus accurately accounts for tare weight based on the dimensions of the tray used to support the commodity.

Other objects and advantages of the invention will be apparent from the following description, the accompanying drawings and the appended claims.

BRIEF DESCRIPTION OF THE DRAWINGS

FIG. 10 is a schematic view of the package sensing system of the packaging machine.

FIGS. 14 and 15 show differing width and height packages passing from the machine (see drawing sheet 10).

FIG. 19 is a system timing diagram for the microprocessor control system of the packaging machine (see drawing sheet 15).

FIG. 21 is a chart of one illustrative film selection algorithm in accordance with the present invention (see drawing sheet 16).

DETAILED DESCRIPTION OF THE INVENTION

I. Overview of Packaging Machine Operation

Figure 1:
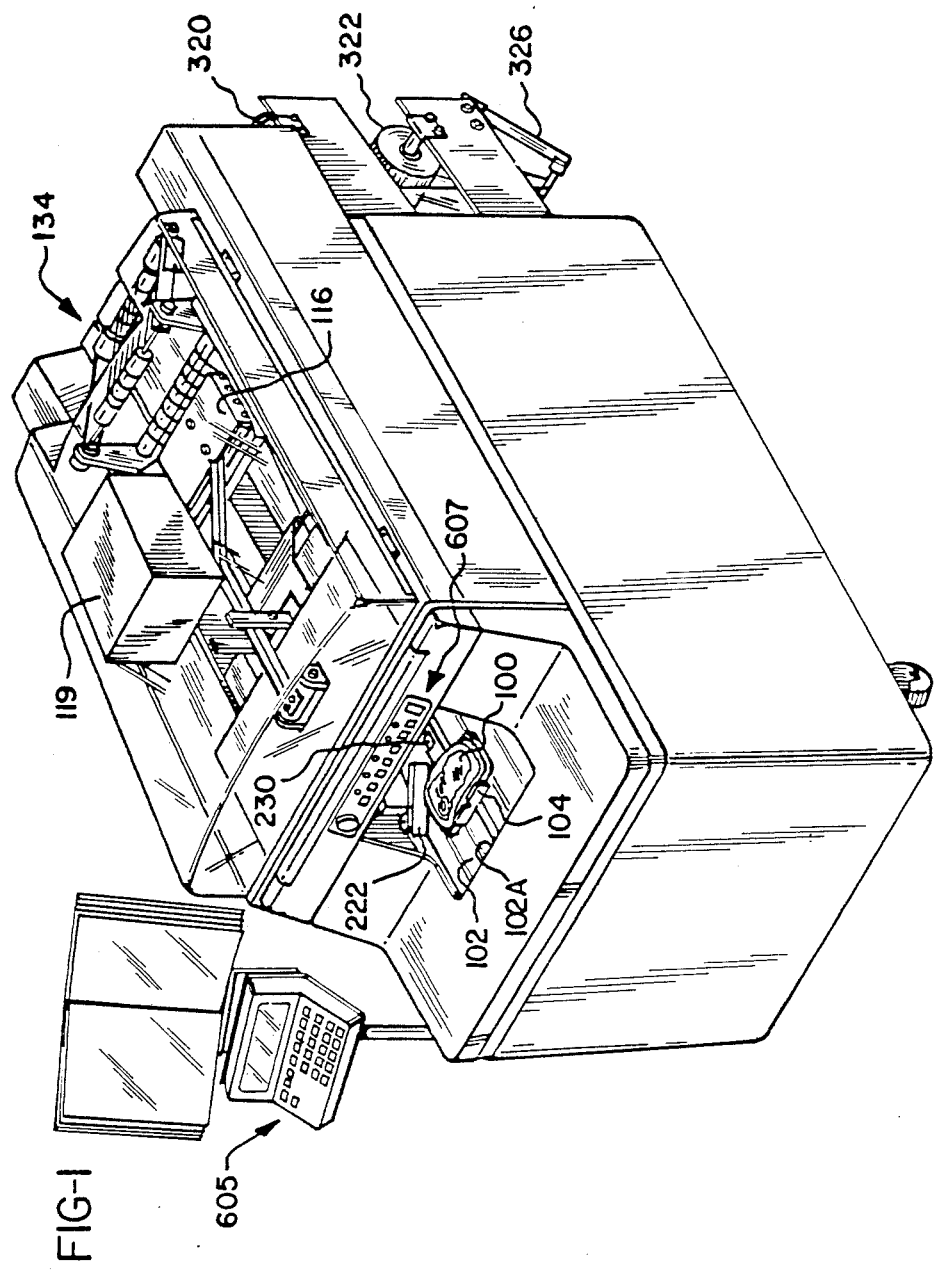
FIG. 1 is a perspective view of a packaging machine embodying the invention of the present application.

FIG. 1 is a perspective view of a packaging machine in accordance with the present invention. As an overview, the general operation of the machine will be described for wrapping and pricing a package 100 shown in FIGS. 1 and 2. The package 100 typically comprises meat or other food products placed upon a tray, i.e., a trayed commodity, which is to be wrapped in stretchable film for attractive display. The package 100 is placed on a feed-in tray 102 and a package feed-in pusher 104 advances the package into the machine where it is supported and carried forward by a weighing conveyor 105 and one of three circulating platforms 106 which are comprised of cylindrical shafts or rods 106A mounted to a conveyor chain.

Figure 2:
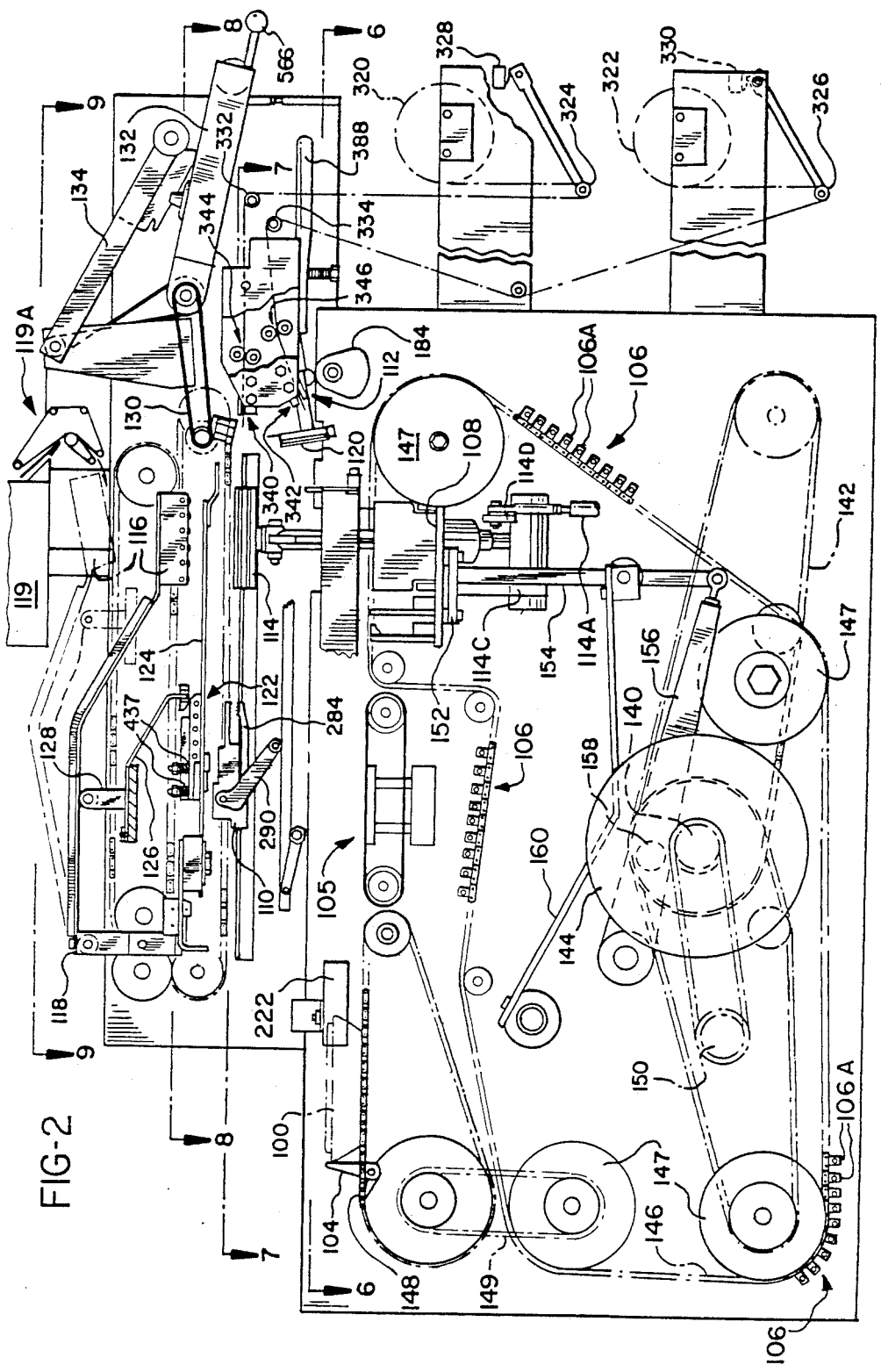
FIG. 2 is a diagrammatic vertical cross-section taken generally along the longitudinal center line of the packaging machine of FIG. 1.
Figure 6:
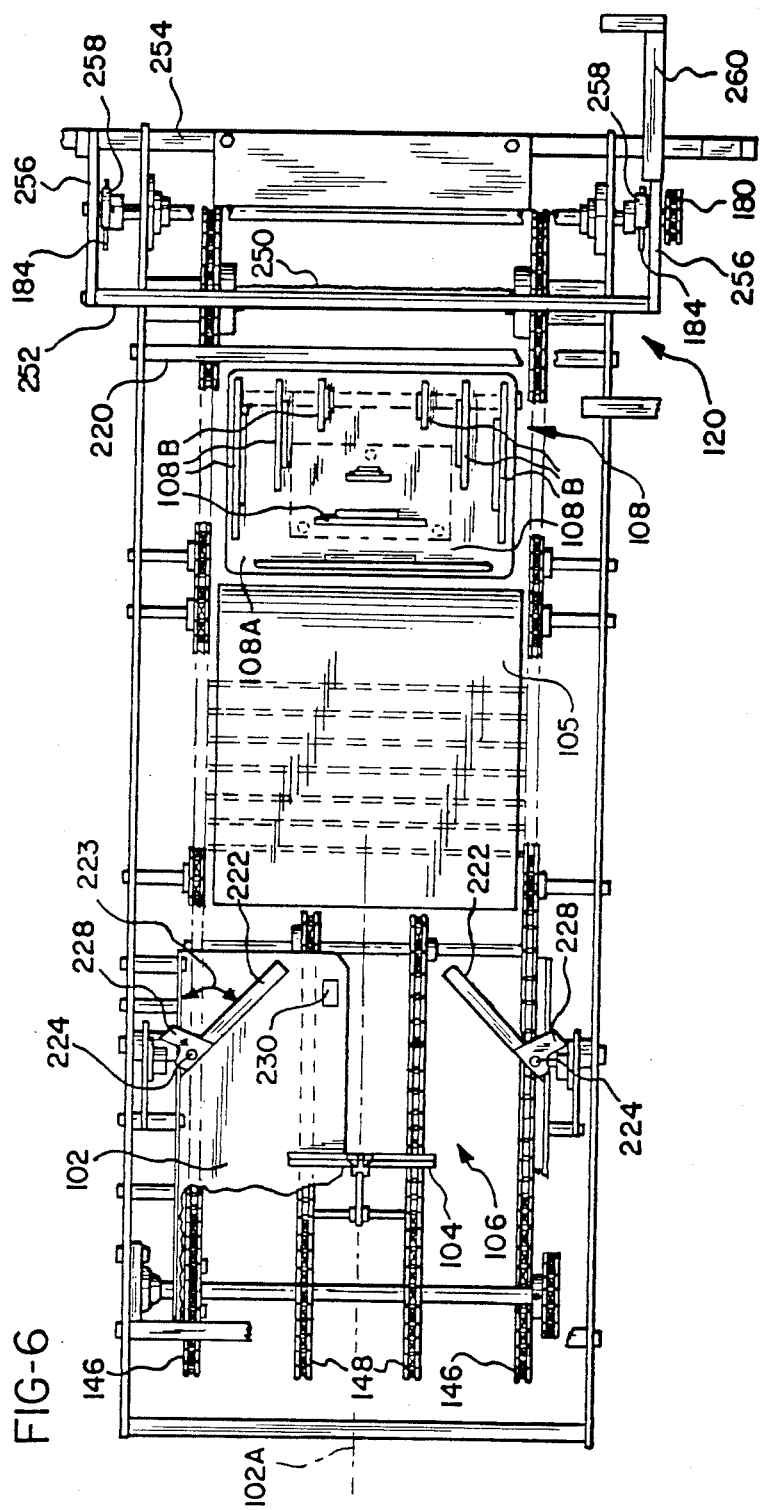
FIGS. 6 through 9 are diagrammatic horizontal cross-sections of the packaging machine taken approximately along the corresponding section lines shown in FIG. 2.

The package 100 is carried to an elevator 108 as best seen in FIGS. 2 and 6. At the same time, a film gripper 110 has been advanced to a film end engaging position 112 where the end of a continuous roll of film is engaged by the gripper 110 and drawn into the machine by retraction of the gripper 110 to the left as shown in FIG. 2. As the package 100 enters the wrapping machine, the length and width dimensions of the package are measured and as the package is carried over the weighing conveyor 105, the package weight is determined. The length and width of the film sheet or section to be used to wrap the package are selected by the machine in response to the length, width and weight of the trayed commodity or package, as will be described hereinafter.

The section of film drawn into the machine is held in tension by the film gripper 110 and is taken by side clamps 114 which engage opposite sides of the film and stretch it outwardly toward the sides of the machine. The package 100 is then elevated by the elevator 108 through the plane of the laterally stretched section of film and engages a package holddown 116. The package holddown 116 is shown in its lowermost position in the solid line drawing of FIG. 2 and is pivoted upwardly about its mounting 118 by an amount corresponding to the height of a package being wrapped.

The package weight is passed to a labeler 119 where the appropriate selling price for the package is computed based upon the weight and prestored price information corresponding to the product being packaged. The labeler 119 prints a label with the computed price and delivers the label to conveying apparatus 119A which transports the label to a labeling head 116A, which may be of conventional structure, positioned within the package holddown 116. Label generation and transportation is well known in the art as disclosed in U.S. Pat. No. 3,878,909 which is incorporated herein by reference. The price label for the package is positioned on the labeling head 116A and is applied to the package as the package is elevated into the wrapping film against the package holddown 116.

The section of film drawn into the machine is severed by a knife 120 and the film is folded under the package 100 by a rear underfolder 122 and side underfolders 124 which are activated by the rear underfolder 122. The package 100 with a film section thus underfolded on three sides and a price label adhered to the upper film surface is pushed out of the film underfolding area of the machine by a package pusher 126. The package pusher 126 includes a cam roller 128 which lifts the package holddown 116 off the package 100 to the dashed line drawing position of FIG. 2 as the pusher 126 is advanced to facilitate ejection of the package from the film underfolding area by the pusher 126 and to permit a price label for the next package to be transported to the labeling head 116A.

As the package 100 is pushed from the machine by the package pusher 126, the remaining fourth edge of the film is folded under the package 100 as the priced package advances onto a conveyor 130. The conveyor 130 transports the package 100 to the sealing and conveying apparatus 132 where the underfolded film is heat sealed to secure the film about the package 100. To ensure firm contact between the package 100 and the sealing/conveying apparatus 132, a pivotally mounted package sealing holddown 134 engages the upper surface of the package 100 and forces or holds it firmly against the sealing/conveying apparatus 132. The package sealing holddown 134 may also be formed to ensure that the price label is firmly adhered to the package. Thus, articles which are initially placed on a tray as illustrated by the package 100 are wrapped in a selected size sheet of film, priced and sealed to form an appealing film covered package which can be immediately displayed for sale.

II. Main Machine Mechanical Drives

Operation of the packaging machine will now be described in more detail with further reference to FIG. 2. A main drive shaft 140 is driven by an electric motor (not shown) and a gear reduction drive (not shown) through a chain 142. The main drive shaft 140 includes four machine operating cams with an elevator cam 144 being shown in FIG. 2. The main drive shaft 140 also drives a chain 146 around sprockets 147 and, in turn, the platforms 106 which are positioned equidistant from one another and connected to the chain 146. The package feed-in pusher 104 is mounted to a chain 148 which is driven by the chain 146 via coupling chain 149. The chain 148 is one-third of the length of the chain 146 so that each time the package feed-in pusher 104 is advanced into the feed-in tray 102, a platform 106 precedes and is synchronized with it to receive a package as it exits from the weighing conveyor 105.

The main drive shaft 140 also drives a potentiometer 150 from which a system clock is derived. The operation of the system clock in the control of the machine will be described hereinafter.

The elevator 108 is supported on a platform 152 and is readily removable therefrom for cleaning purposes. The platform 152 is supported on a shaft 154 which is reciprocated in the vertical direction by a pivotally mounted elevator control arm 156 by means of the elevator cam 144 which engages a cam follower 158. An angled, pivotally mounted stabilizing arm 160 is connected to the shaft 154 to maintain the shaft 154 in a generally vertical orientation throughout its reciprocating motions.

Figure 3:
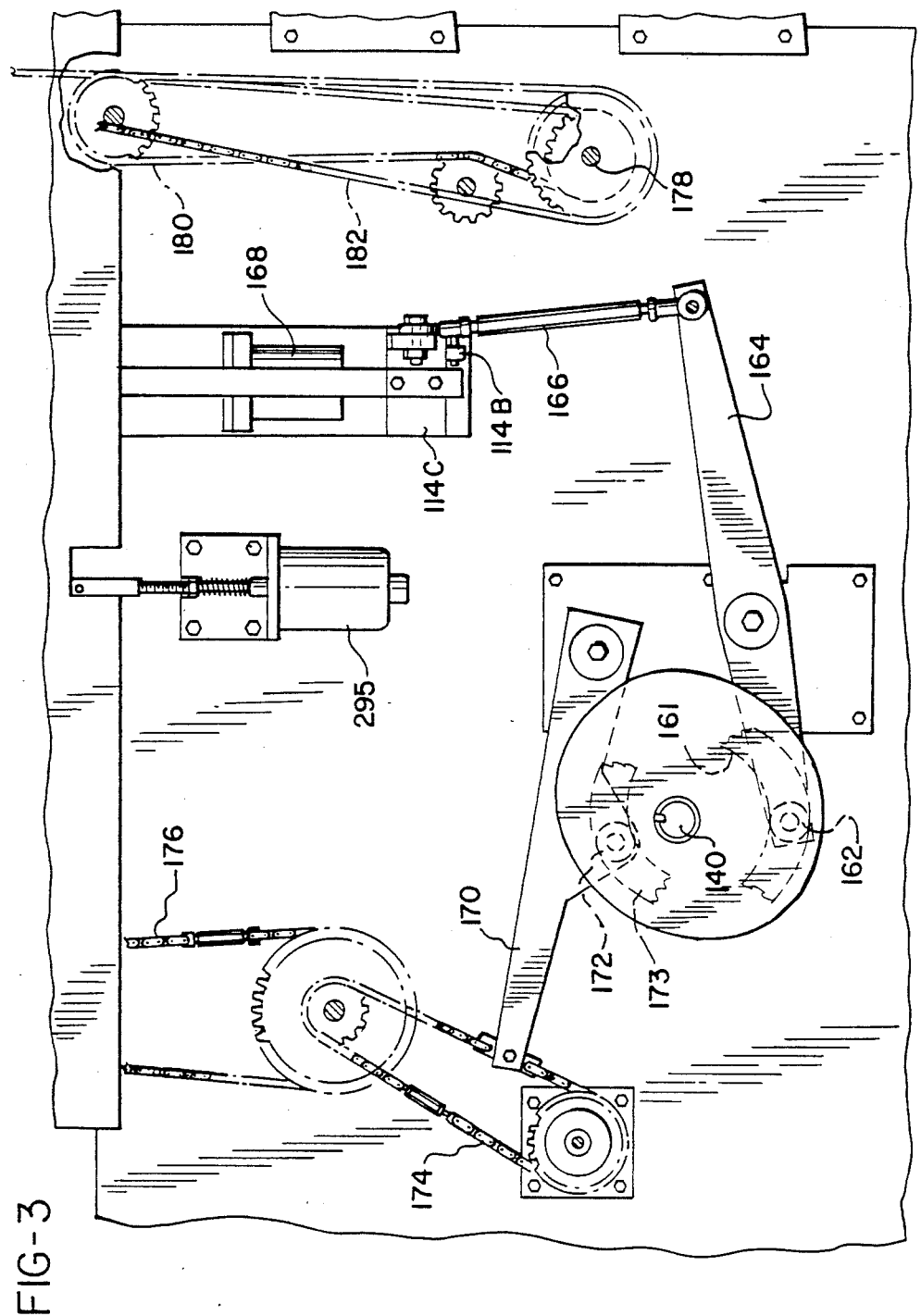
FIG. 3 shows the lower right side of the machine of FIG. 1 with the cover panels removed.
Figure 7:
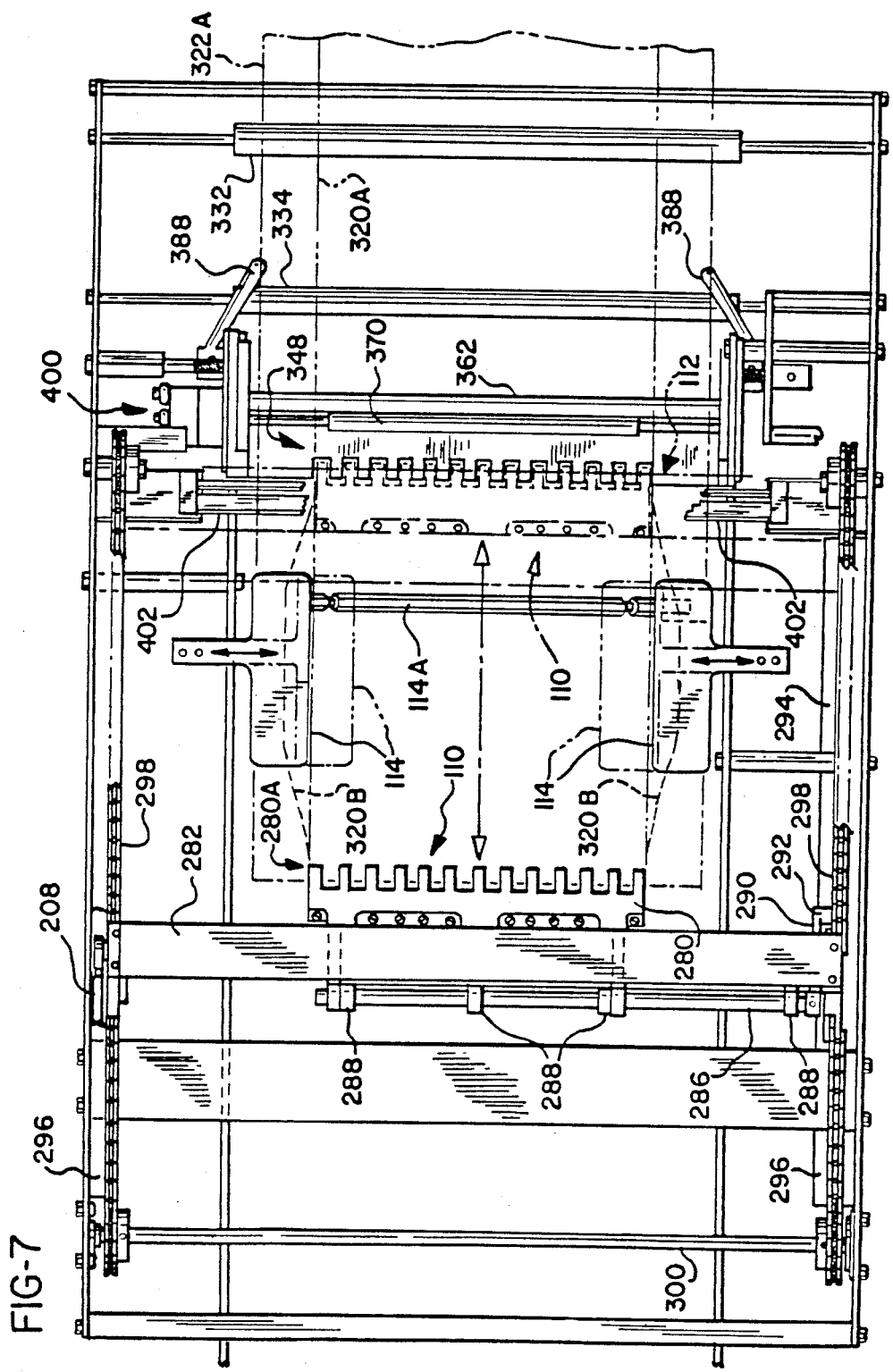

FIG. 3 shows the right side of the machine as shown in FIG. 1 and includes two additional cam surfaces to control the film clamps 114 and the underfolders 122, 124. A film clamp cam 161 mounted on the drive shaft 140 engages a cam follower 162 and in turn activates a clamp lever arm 164 which reciprocates the side clamps 114 between film engaging and film stretching positions via an adjustable link 166. Film clamping jaws of the film side clamps 114 as best seen in FIGS. 2 and 7 are closed by electrical solenoids 168 as will be described hereinafter.

The underfolders 122, 124 are operated via a pivotally mounted lever arm 170 which includes a cam follower 172 which is driven by a cam 173 mounted on the main drive shaft 140. The lever arm 170 reciprocates a chain 174 which in turn reciprocates an underfolder drive chain 176, see also FIG. 8. Finally, a shaft 178 is driven via a chain (not shown) from the main drive shaft 140 to drive continuously chains 180 and 182. The chain 180 drives cams 184 shown in FIGS. 2 and 6 which activate the film severing knife 120 while the chain 182 drives the conveyor 130, the sealing and conveying apparatus 132, as well as conveying belts included on the sealing holddown 134, as will be described hereinafter.

III. Film Length Selection Mechanism

Figure 4:
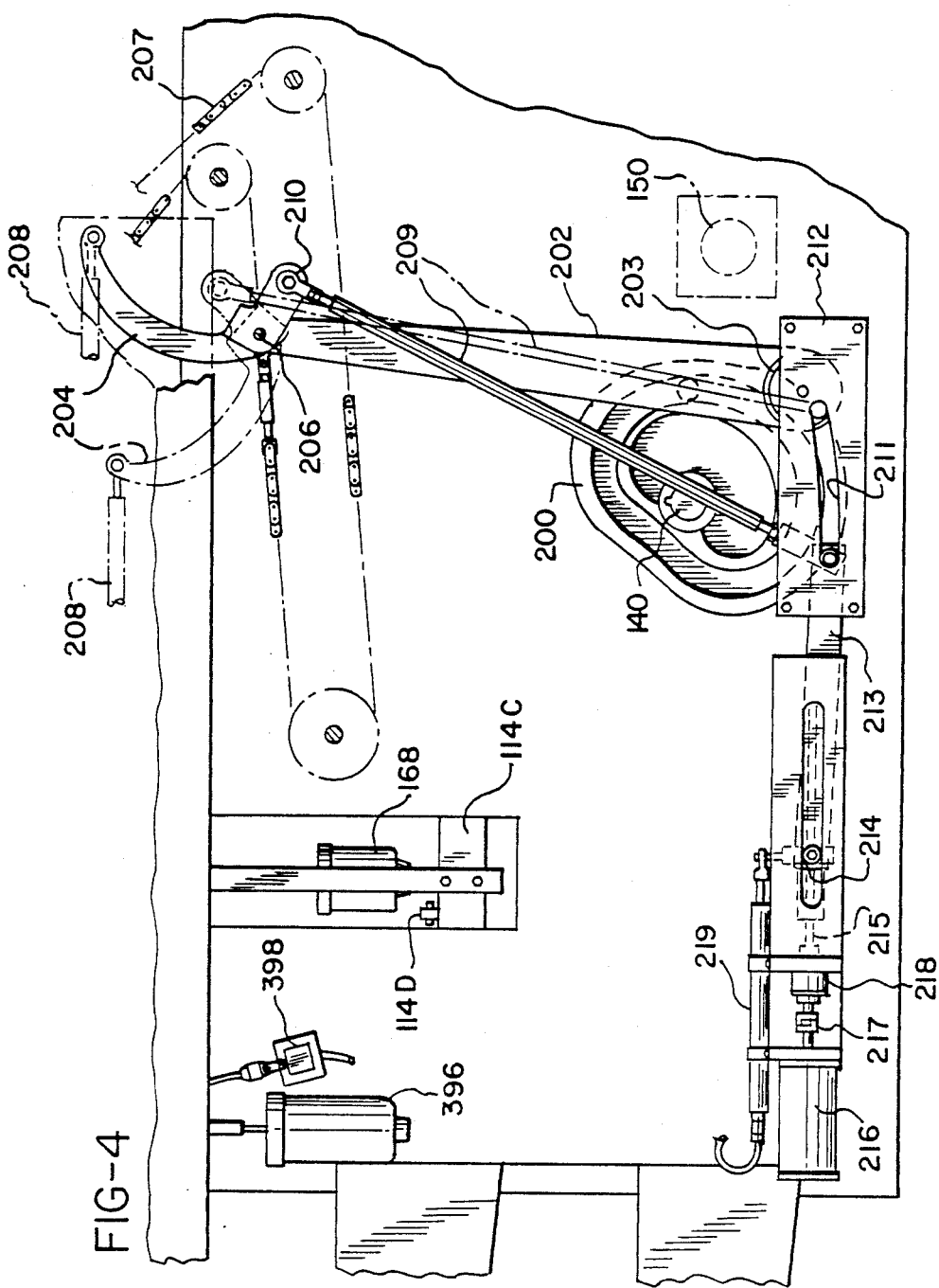
FIGS. 4 and 5 show the lower left side of the machine of FIG. 1 with the cover panels removed to expose the film length selection mechanism of the machine.
Figure 5:
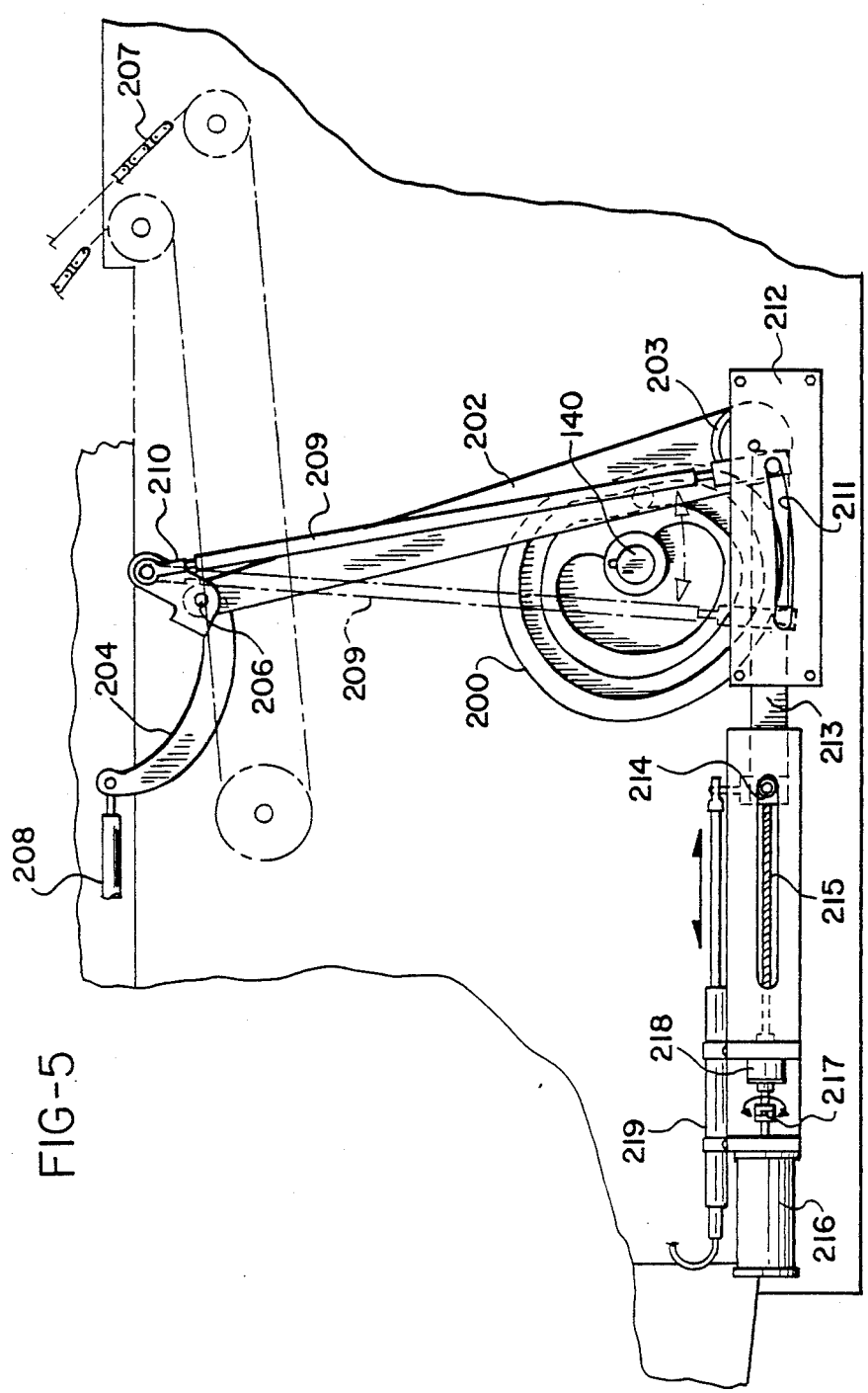

FIGS. 4 and 5 show the left side of the machine as shown in FIG. 1 and illustrate the mechanism for selecting the length of film sections drawn or pulled into the machine by the gripper 110. The main drive shaft 140 is connected to a cam 200 which reciprocates output lever arm 202 approximately between the positions shown in FIGS. 4 and 5. The output lever arm 202 is pivotally mounted to the machine by a bearing 203. An adjustable lever arm 204 is pivotally mounted to the distal end of the output lever arm 202 by a pin 206. The pin 206 is connected to a chain 207 to couple the output lever arm 202 to the chain 207 which drives the package pusher 126 through a fixed stroke.

One end of the adjustable lever arm 204 is coupled to the gripper 110 by a link 208 and the other end of the adjustable lever arm 204 is connected to a link 209 by a universal coupler 210. The opposite end of the link 209 is slidingly engaged within an arcuate slot 211 formed within an adjustment guide plate 212 which is mounted to the machine. The adjustable link 209 can be continuously adjusted to any position along the arcuate slot 211.

The lower end of the link 209 is positioned along the arcuate slot 211 by a bar 213 which engages the lower end of the link 209 and a threaded member 214 which is in turn threadedly engaged by a screw shaft 215. A motor 216 is coupled to the screw shaft 215 through a strain relief clutch mechanism 217. The screw shaft 215 can be secured against rotation by an electrically activated brake 218 which selectively secures or releases the screw shaft 215. A linear potentiometer 219 is coupled to the threaded member 214 and monitors the position of the threaded member 214 so that the control system for wrapping can determine the adjustment of the lower end of the link 209 within the arcuate slot 211 to thereby monitor the setting of the length of film to be drawn for wrapping a package as will be described hereinafter.

The operation of the film length selection mechanism can now be described with reference to FIGS. 4 and 5. The solid line drawing of the link 209 near the left end of the arcuate slot 211 provides for maximum articulation of the adjustable lever arm 204 when the output lever arm 202 is moved to the gripper extension position shown in FIG. 4. This articulation can be reduced by moving the lower end of the link 209 to the right as shown in FIGS. 4 and 5 in the arcuate slot 211 to a minimum film length position (shown in phantom in FIG. 4), i.e., near the extreme right end of the arcuate slot 211. Thus, a continuous adjustment of the film extension position of the film gripper 110 is provided between the solid line position and the phantom line position shown in FIG. 4. The extreme left hand and right hand positions of the link 209 within the slot 211 respectively correspond to the maximum and minimum lengths of film to be drawn into the machine for wrapping a package.

The film gripper 110 must always be moved initially to a fixed film end engaging position 112 determined by film feeding jaws so that a film end may be gripped. To this end, the arcuate slot 211 is centered upon the point of connection of the link 209 with the adjustable lever arm 204 when the lever arm 202 is in the forward, film end engaging position shown in FIG. 5. Thus, for all the continuously variable positions of the lower end of the link 209 within the arcuate slot 211, the forward position or film end engaging position of the gripper 110 is the same. The repeated return of the film gripper 110 to the fixed film end engaging position 112, regardless of the film extension setting of the film gripper, is illustrated in FIG. 5. The lower end of the link 209 can be positioned to any film extension setting between and including the maximum and minimum settings defined by the end points of the arcuate slot 211 with no effect on the positioning of the adjustable lever arm 204 when the output lever arm 202 is in the film end engaging position shown in FIG. 5.

The length of film to be drawn into the wrapping machine is set by positioning the lower end of the link 209 to a desired position within the arcuate slot 211. Once set, a film length can be maintained indefinitely to reciprocate the film gripper 110 between the fixed film end engaging position 112 and a selected film extension position to thereby draw a preferred length of film for wrapping a plurality of packages of approximately the same size characteristics.

IV. Package Handling

FIG. 6 is the first of a series of sectional plan views showing additional details of the machine of FIG. 1. The series of sectional plan views progress from the package feed-in level upwardly through the machine much as a trayed commodity to be packaged passes through the machine. Structures located at various levels of the machine as identified in FIG. 2 are illustrated in the drawings. For clarity sake and ease of description, features associated with levels of the machine illustrated in other drawings as well as structural detail unnecessary for an understanding of the machine have been deleted. Accordingly, the sectional plan view of FIG. 6 shows the level of the package feed-in tray 102, the top, package conveying surface of the weighing conveyor 105 and the package supporting level of the elevator 108.

IV.A. Package Feed-In

An operator of the packaging machine places a package to be wrapped on the feed-in tray 102. Preferably the package is placed near the central portion of the feed-in tray 102 and ideally the package should be aligned approximately on the centerline 102A of the feed-in tray. A package thus placed on the feed-in tray 102 is engaged by the package feed-in pusher 104 which is continuously circulated on the chains 148. The package feed-in pusher 104 moves the package onto the weighing conveyor 105. The movement of the package is synchronized with the chains 146 such that one of the conveyor platforms 106 receives the package from the weighing conveyor 105. The receiving platform 106 transports the package to the elevator 108. At the elevator 108, a package stop 220 engages and restrains the package and permits the platform 106 to be moved from beneath the package. The package is then supported on the upper package supporting surface of the elevator 108.

The elevator 108 comprises a base platform 108A and a plurality of hingedly mounted slats 108B which are resiliently biased toward the upright position, for example, by a plurality of springs (not shown), to receive and support packages placed thereon. This structure of the elevator 108 permits the underfolders 122, 124 to collapse the elevator slats 108B and transfer support of a package to the underfolders 122, 124 as film is folded about the package as is well known in the art.

As a package to be wrapped is pushed across the feed-in tray 102 and onto the weighing conveyor 105, the package length and width are determined by a package sensing system.

IV.B. Package Sensing System

Portions of the package sensing system are shown in FIGS. 2 and 6, however, the structure and operation of the system are best understood by referring to the schematic view of FIG. 10. With reference to the dimensions of packages which are sensed, herein the length (L) of a package refers to the dimension of the package in the longitudinal direction of the machine. The width (W) of the package refers to the dimension of the package perpendicular to the line of movement of the package into the machine, see FIG. 10. Accordingly, the width of a package being wrapped by the machine is normally longer than the length of the package.

In the package sensing system, lateral sensing means for sensing the width of packages comprises swing arms 222 which are mounted for pivotal movement on pins 224 on either side of the feed-in tray 102. The swing arms 222 are resiliently biased by springs (not shown) encircling the pins 224 or otherwise to force the swing arms 222 to extend into the package entryway above the feed-in tray 102. The swing arms 222 are inclined into the wrapping machine at an angle 223, see FIG. 6, of approximately 45° and maintained at that angle by mechanical contact between the swing arms 222 and the machine. The resiliency of the springs biasing the swing arms 222 into the package entryway of the machine is sufficient to permit the swing arms 222 to be deflected by entering packages yet tends to center packages within the entryway to the machine. The angular orientation of the swing arms 222 promotes the tendency of the swing arms 222 to center packages within the entryway of the machine, however, it is noted that an angular orientation of up to approximately 90° would be possible for the swing arm extension into the entryway.

Narrow packages to be wrapped by the machine may pass between the swing arms 222 without deflecting either swing arm. If a narrow package is placed off center on the feed-in tray 102, one of the swing arms 222 may be deflected and tend to force the package toward the center of the feed-in tray. When a wide package is placed on the feed-in tray, both swing arms 222 are deflected by the package as it passes into the wrapping machine. Deflections of the swing arms 222 by packages entering the wrapping machine are detected by electrical switches coupled to the swing arms 222.

In the preferred embodiment of the package sensing system, Hall effect switches 226 are utilized. Hall effect switches prevent contact bounce which may be encountered in other designs of electrical switches and can lead to erroneous package signals. Such Hall effect switches are activated by vanes 228 and are well known in the art and commercially available, for example, from Micro Switch, a division of the Honeywell Corporation, as a Type 4AV vane switch.

The provision of lateral sensing means on both sides of the package entryway essentially eliminates the possibility of erroneously indicating a narrow package as being a wide package since both sensing means must be simultaneously activated for a wide package indication. In the preferred embodiment, both swing arms 222 must be deflected before a wide package is indicated. As illustrated, a single switch is coupled to each lateral sensing means. It is noted that a wide variety of package widths can be detected by the use of multiple switches illustrated by switches 229 in FIG. 10 as well as by other sensing arrangements which include sensors on both sides of the package entryway. Of course, the use of the swing arms 222 has the additional advantage of tending to center packages as they enter the packaging machine.

Longitudinal sensing means are provided for sensing the length of a package as it is fed into the packaging machine. The longitudinal sensing means comprises a plate 230 hingedly mounted into the upper surface of the feed-in tray 102. The plate 230 is biased to extend slightly above the surface of the feed-in tray 102 and is coupled to an electrical switch (not shown) which is activated by depression of the plate 230. The switch generates a signal upon contact of a package with the plate 230 as the package is being pushed into the packaging machine by the feed-in package pusher 104. This signal is used to determine the length of the package entering the machine as will be described hereinafter.

The length and width signals generated by the package sensing system are combined with the package weight for a known product to serve as an indication of the package height such that the length and the width of a section of stretchable film can be selected to wrap the sensed package. One particular selection algorithm will be described hereinafter.

The knife 120 is also shown in FIG. 6 and includes a serrated blade 250 secured to a cutter bar 252 which is mounted for reciprocating pivotal movement about a shaft 254 by arms 256. The cutter bar 252 and associated serrated blade 250 are reciprocated by the cams 184 which drive cam followers 258 which are connected to the arms 256. The knife 120 can also be manually operated by a handle 260 connected to one of the arms 256.

IV.C. Film Side Clamps and Gripper

FIG. 7 illustrates the next level progressing upwardly through the packaging machine and includes the film gripper 110 which draws sections of film into the machine. The film gripper 110 reciprocates between the fixed film end engaging position 112 as represented by the dashed line drawing of the gripper 110 and one of a plurality of film extension positions one of which is represented by the solid line drawing of the film gripper 110. The length of the reciprocating stroke of the film gripper 110 is controlled by the mechanism illustrated in FIGS. 4 and 5 as previously described.

The film gripper 110 comprises a fixed upper jaw 280 which is securely mounted to a trolley bar 282. A lower gripper jaw 284, as best seen in FIG. 2, is mounted for pivotal movement toward and away from the fixed upper jaw 280. The lower gripper jaw 284 is firmly mounted to a trunnion shaft 286 which is mounted for rotation to the trolley bar 282 through circular members 288 which are firmly fixed to the trolley bar 282. A lever arm 290 is mounted to the trunnion shaft 286 for selectively opening and closing the lower gripper jaw 284 against the fixed upper jaw 280.

The lever arm 290 includes a roller end 292 which engages a movable track 294. The track 294 is mechanically coupled to the right sidewall of the machine by links to maintain the track in a generally horizontal position as it is moved up and down by a solenoid 295 shown in FIG. 3. When the track 294 is elevated, the lever arm 290 is lifted to rotate and close the lower gripper jaw 284 against the fixed upper jaw 280. The roller end 292 of the lever arm 290 permits operation of the lower gripper jaw 284 as the film gripper 110 is moved between the fixed film end engaging position 112 and the variable film extension position. The trolley bar 282 rides on guide rails 296 mounted on both sides of the machine and is propelled by the film length selection mechanism shown in FIGS. 4 and 5 through the link 208. The trolley bar 282 is maintained in the orientation shown throughout its reciprocating travel by chains 298 which are interconnected through a rotating shaft 300.

IV.D. Film Handling Apparatus

The disclosed packaging machine is designed to provide a choice between two differing film widths for wrapping a variety of package sizes. The film for wrapping packages is provided on continuous rolls as shown in FIG. 2 with the upper roll 320 being arbitrarily designated as the narrow width film 320A and the lower roll of film 322 being arbitrarily designated as the wide width film 322A. Film widths usable in the disclosed packaging machine range between approximately thirteen (13) and nineteen (19) inches.

Film from the continuous rolls of film 320 and 322 is fed under tensioning rollers 324 and 326, respectively, in a manner known in the art. In particular, the associated film is fed under each tensioning roller so that the roller assembly is elevated as film is drawn into and used by the wrapping machine. As the roller assembly is raised, a brake is removed from the roll of film so that it can freely rotate and feed additional film which is taken up by the associated tensioning roller as it falls to a lower position where it once again functions to apply the brake to the film roll.

Electrical switches 328 and 330 monitor the tensioning or "dancing" rollers 324 and 326, respectively. The dancing rollers 324 and 326 are adjusted such that they are raised to a minimum height which opens one or the other of the switches 328 and 330 each time film is drawn into the machine. The adjustment of the dancing rollers is based on the minimum length of film drawn into the machine to ensure that one of the switches 328, 330 is opened if film is drawn into the machine. If the film is exhausted from a film roll, breaks or otherwise becomes disengaged from film feeding apparatus during machine operation, film will not be drawn into the machine and the associated switch will not be opened by its dancing roller. The failure of the switch to open is detected to indicate a film problem and the machine is stopped.

The continuous film from the rolls 320 and 322 is fed under the tensioning rollers 324 and 326, up over guide rollers 332 and 334 and into the selective film feeding apparatus shown at the film end engaging position 112. The guide rollers 332 and 334 include one-way clutches to be freely rotatable in the counter-clockwise direction as shown in FIG. 2. The rollers 332 and 334, hence, permit the film to be freely drawn into the machine through the film feeding apparatus, but retard its tendency to be withdrawn from the machine by the dancing rollers.

The film feeding apparatus comprises two sets of film feeding jaws 340 and 342. The film feeding apparatus can be seen in FIGS. 2, 7, 11, 12 and 13. The film feeding jaws are associated with pinch rollers 344 and 346, respectively, with the film being threaded between the pinch rollers and the jaws so that the film may be gripped by the film gripper 110 at the film end engaging position 112. The film feeding jaws 340 and 342 have serrated leading edges 348 which mate with a serrated leading edge 280A of the gripper 110 when the gripper 110 is moved to the film end engaging position 112. Thus, with the film extending to the front edge of the film feeding jaws 340 and 342, the teeth of the serrated edge 280A of the film gripper 110 can engage the film between the teeth of the serrated leading edge 348 of one of the sets of film feeding jaws 340 and 342.

The film feeding jaws 340, 342 and associated pinch rollers 344, 346 extend between end plates 350 which are mounted between the sidewalls of the packaging machine to pivot about the point 352. The end plates 350 are placed into one position to feed narrow film through film feeding jaws 340 as shown by the solid line drawing in FIG. 14. To feed wide film through film feeding jaws 342, the side plates 350 are pivoted about the point 352 to a second position shown by the dot-dashed line drawing of FIG. 13.

The film feeding jaws 340 and 342 each comprises a fixed jaw 354. The upper film feeding jaws 340 have the lower jaw fixed while the lower film feeding jaws 342 have the upper jaw fixed. The movable jaw 356 of the upper film feeding jaws 340 can be pivoted upwardly away from the upper fixed jaw 354 while the movable jaw 358 of the lower film feeding jaws 342 can be pivoted downwardly away from the lower fixed jaw 354.

Figure 11:
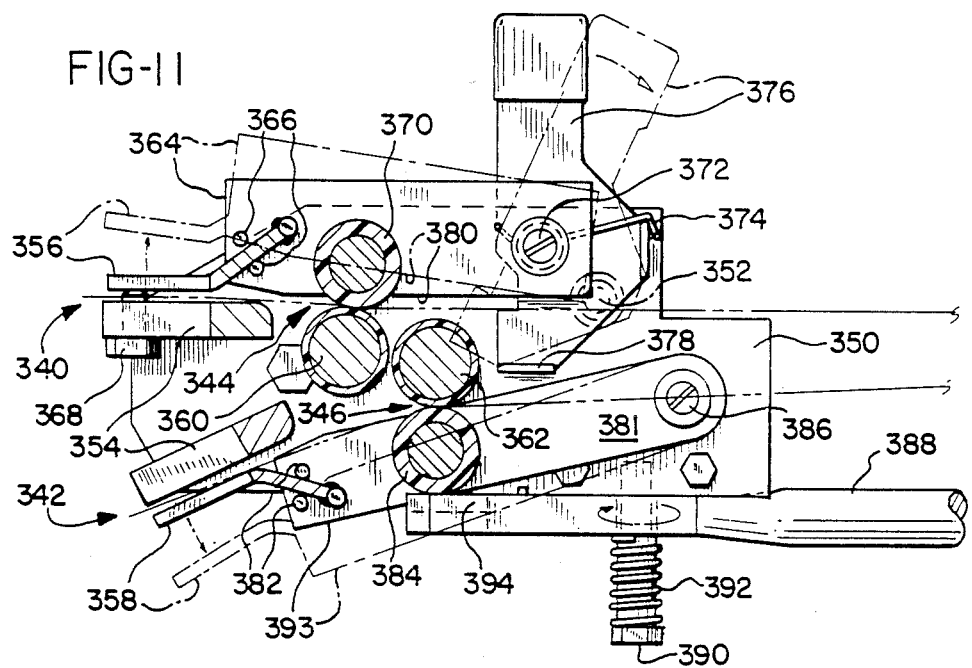
Figure 13:
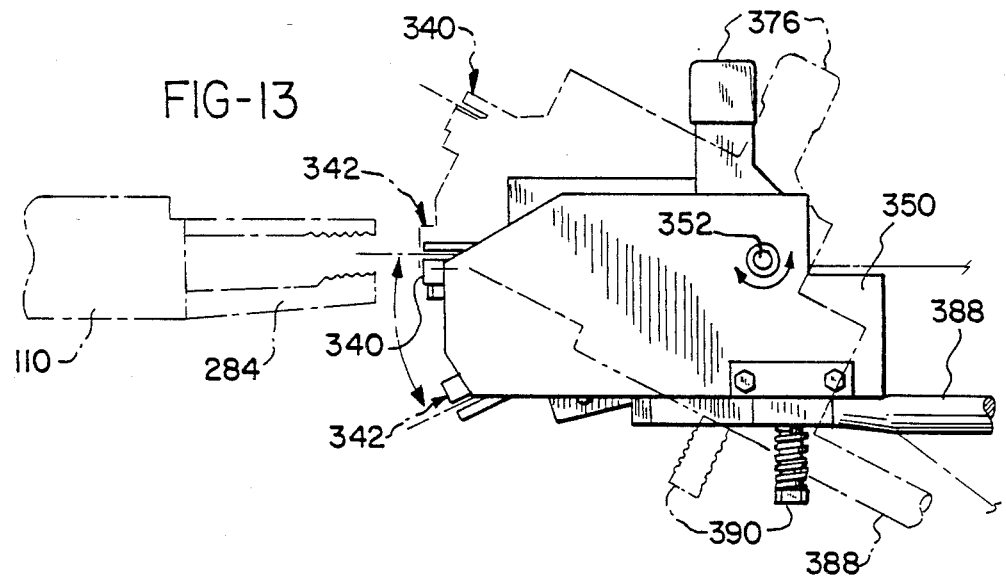

Two fixed rollers 360 and 362 are mounted for rotation between the end plates 350. The movable jaw 356 is pivotally mounted between arms 364 and the pivotal motion of the movable jaw 356 relative to the arms 364 is limited by pins 366. When the upper jaw 356 is in the closed solid line position shown in FIG. 11, a predetermined closed film feeding separation is maintained between the movable jaw 356 and the upper fixed jaw 354 by a bolt 368. A roller 370 is also mounted between the arms 364. The roller 370 is coated with rubber or other film gripping material and includes a one-way clutch to allow rotation only in the clockwise direction as shown in FIG. 11. The arms 364 are mounted to be pivoted about screws 372.

During machine operation, the film feeding jaws 340 and associated pinch rollers 344 are maintained in their closed position as shown by the solid line drawing in FIG. 11 by springs 374 which extend between each arm 364 and an associated lever arm 376. The lever arms 376 bias the springs 374 to maintain the arms 364 in the closed position. To thread film into the upper film feeding jaws 340, the lever arms 376 are rotated clockwise to the dotted line position shown in FIG. 11. As the lever arms 376 are rotated, tension is relieved from the springs 374. Also, tabs 378 engage the lower surfaces 380 of the arms 364 to lift the arms 364 and open the jaws 340 and separate the pinch rollers 344. Detents (not shown) on the lever arms 376 and the end plates 350 maintain the lever arms 376 in the closed and opened positions which are thereby stably determined. Once placed in the opened position, narrow film can be readily fed between the pinch rollers 344 and the upper film feeding jaws 340 using both hands.

The lower film feeding jaws 342 are also mounted to open for film threading purposes. The movable jaw 358 is pivotally mounted between arms 381 with the pivotal movement of the jaw being limited by pins 382. A roller 384 which comprises the second of the pinch rollers 346 is mounted between the arms 381. The roller 384 is covered with rubber or other film gripping material and includes a one-way clutch which permits the roller 384 to rotate only in the counter-clockwise direction as shown in FIG. 11. The arms 381 are mounted for pivotal movement about a screw 386.

Due to the fact that the arms 381 tend to move under the force of gravity toward the opened position, a more substantial closing apparatus is provided to maintain the jaws 342 and the pinch rollers 346 in the closed, film feeding position, shown by the solid line drawing in FIG. 11. Lever arms 388 are mounted to rotate about bolts 390 and are spring loaded against the end plates 350 by springs 392. The lever arms 388 can be rotated between a jaws closed position shown by the solid line drawing in FIG. 12 and a jaws opened position shown by the dotted line drawing in FIG. 12. A cam surface 394 engages the lower surface 393 of the arms 381, once they have been manually raised by a machine operator, to fully close and lock the lower jaws 342 and the pinch rollers 346 into the closed, film feeding position.

Detents (not shown) on the lever arms 388 and the end plates 350 serve to define jaws opened and jaws closed positions of the lever arms 388. As with the jaws 340, when the film feeding jaws 342 and pinch rollers 346 are opened, wide film can be conveniently threaded between and spread across the film feeding jaws 342 and the pinch rollers 346 using both hands. The jaws and pinch rollers can then be closed by manually raising the arms 381 and closing the lever arms 388.

Figure 12:
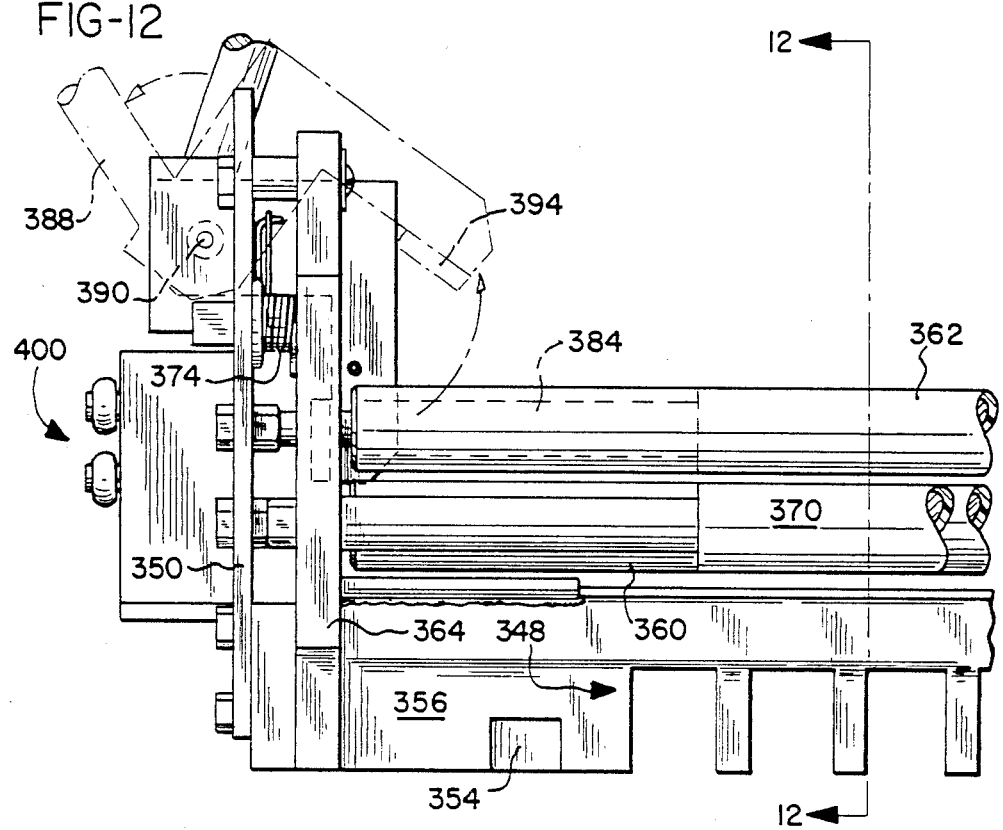
FIGS. 11 through 13 show the film feeding apparatus of the packaging machine (see drawing sheets 11 and 12).

The film feeding apparatus is rotated about the pivot point 352 by two solenoids 396 and 398, shown in FIG. 4. The solenoid 396 pushes the film feeding apparatus into the upper, wide film feeding position and the solenoid 398 pulls the film feeding apparatus into the lower, narrow film feeding position. Due to the mass of the film feeding apparatus, the solenoid 396 is larger than the solenoid 398 which is aided by the gravitational tendency of the film feeding apparatus to assume the narrow film feeding position. The connection of the solenoids 396 and 398 to the film feeding apparatus is best seen in FIGS. 7 and 12 at 400.

FIG. 7 also shows the side clamps 114 which engage opposite sides of a film sheet which has been drawn into the machine by the gripper 110 and stretch it outwardly toward the sides of the film wrapping machine. Stretching of the narrow width film 320A is generally illustrated by the dashed stretched film lines 320B in FIG. 7. The film clamps 114 are shown in their inserted position by the dashed line drawing and in their extended, stretching position by the solid line drawing. The side clamps 114 are reciprocated between the inserted and extended positions as previously described with reference to FIG. 3. A link 114A extends from a tab 114B below the hinged mounting 114C of the side clamp mounted in the right hand side of the machine as shown in FIG. 3, and extends to a tab 114D located above the hinged mounting 114C of the side clamp mounted in the left hand side of the machine as shown in FIGS. 2 and 4. The link 114A thus causes the film clamps 114 to move inwardly and outwardly in synchronism with one another.

Finally, an upper cutter bar 402 is shown in FIG. 7. The upper cutter bar 402 receives the serrated blade 250 to cut selected lengths of film from the rolls 320, 322 when the knife 120 is elevated manually or by the cam 184 and clamps the film end for cutting during the side and rear underfolding operation. Film clamping is performed by an elongated spring clip (not shown) which extends across the cutter bar 252.

IV.E. Film Underfolders

Figure 8:
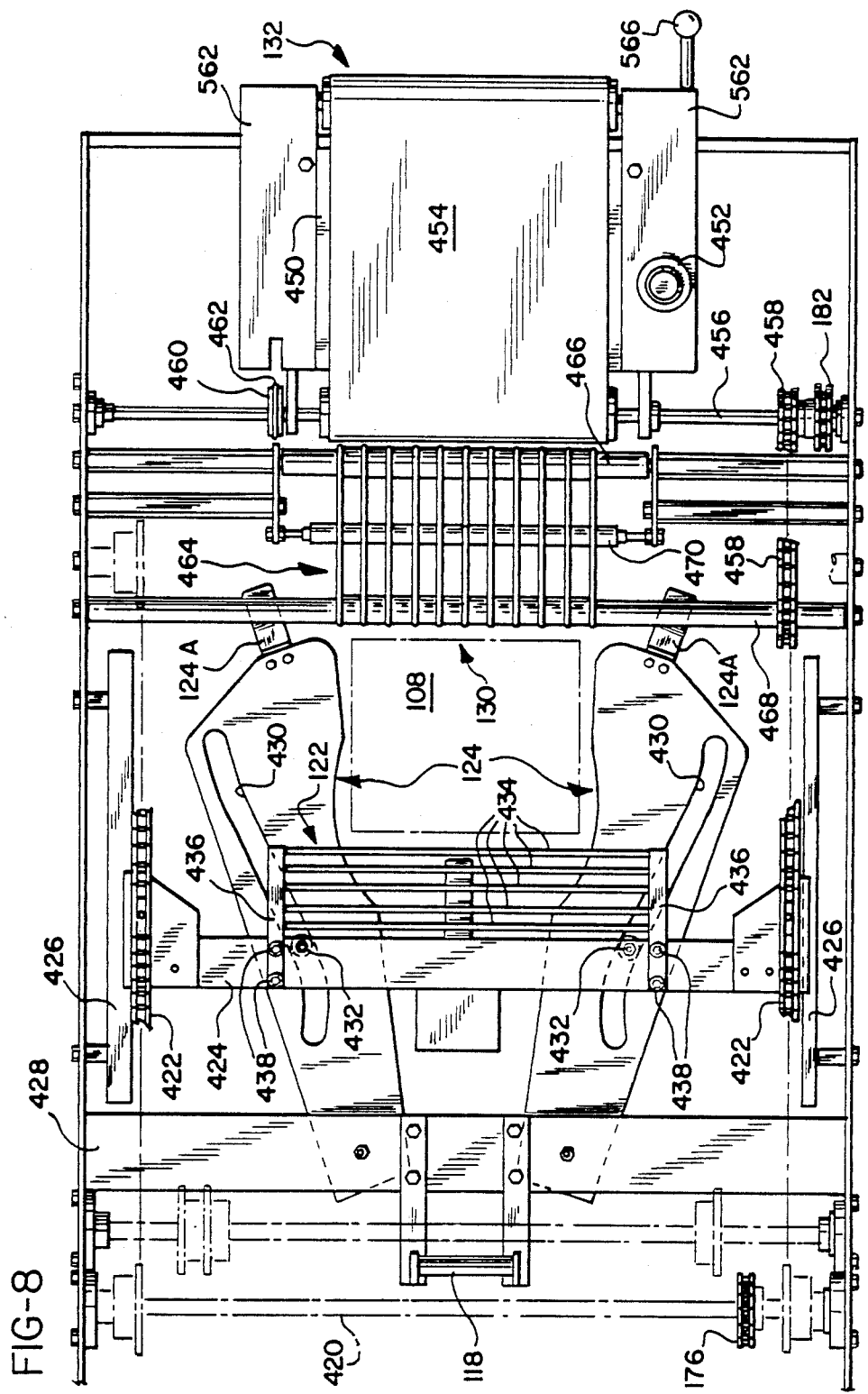

FIG. 8 illustrates the next level progressing upwardly through the packaging machine and includes a plan view of the underfolders 122, 124, the conveyor 130 and the sealing/conveying apparatus 32. The underfolders 122, 124 are driven by the chain 176 as described with reference to FIG. 3. The chain 176 drives a shaft 420 which in turn drives underfolder drive chains 422 which are connected to a trolley bar 424. The trolley bar 424 rides on guide rails 426 connected to the sides of the machine.

The side underfolders 124 include angular extensions 124A and are pivotally mounted to a support bar 428 extending between the sides of the packaging machine. A curvilinear cam surface 430 is formed into each of the side underfolders 124. Each cam surface 430 receives a cam driver 432, each of which is firmly connected to and moves with the trolley bar 424. Thus, as the trolley bar 424 is moved toward the conveyor 130 to force the rear underfolder 122 under a package, the side underfolders 124 are simultaneously pivoted inwardly. Thus, film is folded under three sides of a package by the simultaneous action of the rear underfolder 122 and the side underfolders 124. As the side underfolders 24 are pivoted inwardly, the extensions 124A tuck in the sides of the leading film edge before the leading film edge is folded under the package by being pushed onto the conveyor 130 by the package pusher 126.

The rear underfolder 122 comprises a plurality of rods 434 which are mounted between support arms 436 with each of the rods 434 being freely rotatable within the side arms 436. The side support arms 436 are spring mounted to the trolley bar 424 by compression springs 437 (see FIG. 2) which encircle bolts 438 so that the support arms 436 are resiliently forced against the trolley bar 424. This mounting arrangement for the support arms 436 permits the rear underfolder 122 to be moved away from the trolley bar 424 to facilitate the removal of package jams which may occur between the rear underfolder 122 and the side underfolders 124, the conveyor 130 or other parts of the wrapping machine.

IV.F Film Sealing and Conveying Apparatus

The sealing/conveying apparatus 132 comprises a heating pad 450 and a continuous conveyor belt 454. The temperature of the heating pad 450 is adjustable via a temperature control which is adjusted by rotating a knob 452. The conveyor belt 454 is carried over the heating pad 450 by a shaft 456 which is driven by the chain 182 as described with reference to FIG. 3. The shaft 456 also drives the conveyor 130 through a chain 458 and the package sealing holddown 134 via a pulley 460 and a "crossed" belt 462 shown in FIGS. 16 and 17. The belt 462 is crossed so that the conveyor 454 and the holddown 134 are rotated counter to one another to complement each other in conveying packages from the machine over the heating pad 450. The sealing/conveying apparatus 132 is pivotally mounted to the shaft 456.

The conveyor 130 comprises a plurality of belts 464 which are mounted between a rotating shaft 466 and a shaft 468 which is driven by the chain 458. The shafts 466 and 468 include grooves for receiving the belts 464. A freely rotating roller 470 is mounted within the belts 464 to support the upper portion of the belts if they are depressed by packages being conveyed by the conveyor 130.

Figure 9:
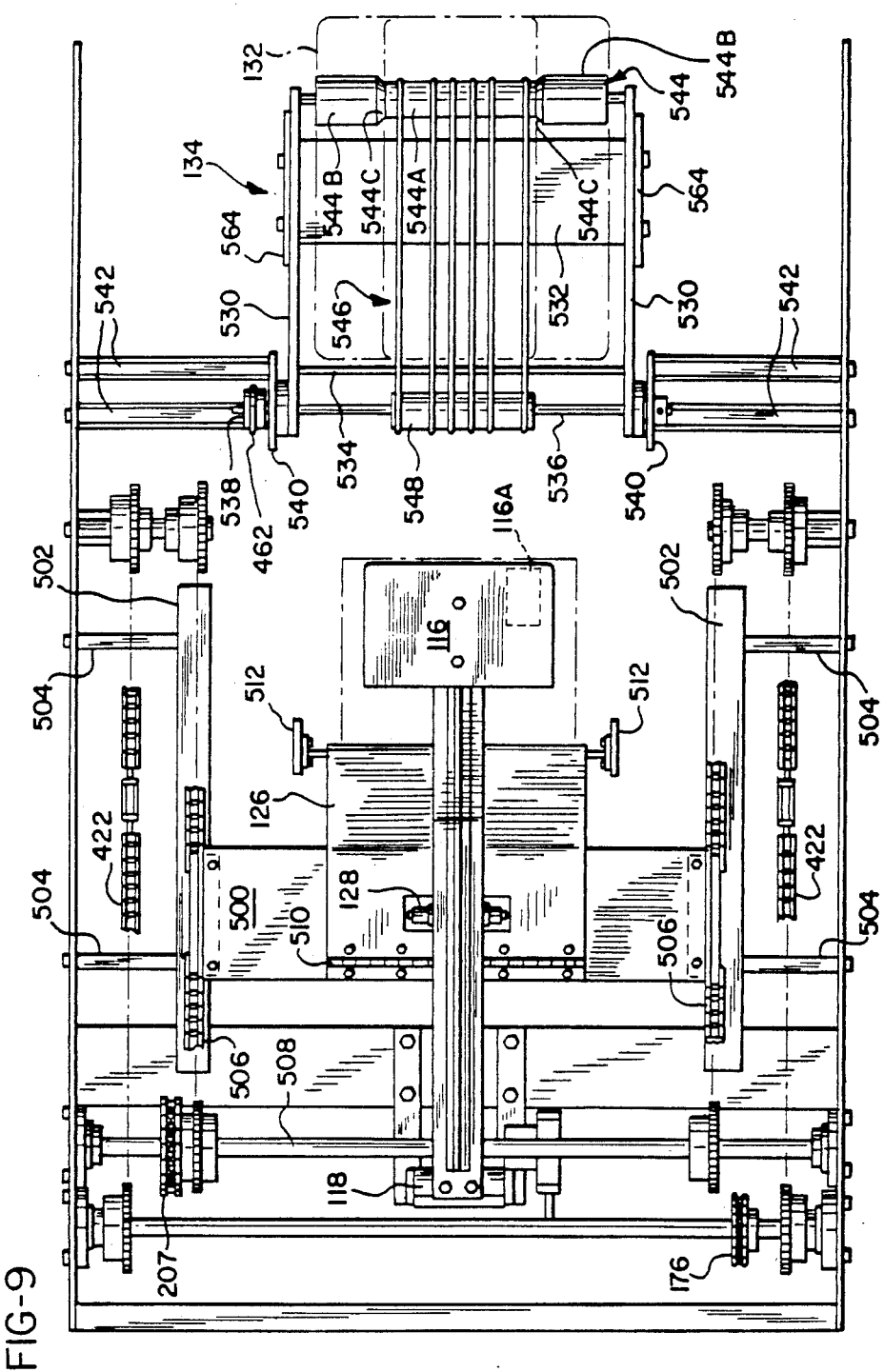

FIG. 9 illustrates the next level progressing upwardly through the film wrapping portion of the packaging machine and includes a plan view of the package holddown 116, the package pusher 126 and the pivotally mounted package sealing holddown 134. The package holddown 116 is positioned over the elevator 108 and provides a downward force on packages while film is folded under them by the underfolders 122, 124. The package holddown 116 is pivotally mounted at 118.

As previously described, the package holddown 116 includes a labeling head 116A which receives a printed price label from the label conveying apparatus 119A to be applied to each package as it is being wrapped. Conveniently, the downward force of the package holddown 116 forces the label held by the labeling head 116A against the upper surface of the film as the package is elevated into the film and the film is folded under the package. Hence, in accordance with the present invention, a single structure ensures that the package is properly restrained for film underfolding and simultaneously provides force for applying a price label to a package.

The package pusher 126 is hingedly mounted to a trolley bar 500 which rides on rails 502 secured to the sidewalls of the packaging machine through spacers 504. The trolley bar 500 is connected to chains 506 which are driven through a shaft 508 by the chain 207 as previously described with reference to FIGS. 4 and 5. The cam roller 128 is mounted to the trolley bar 500 for lifting the package holddown 116 off packages as the pusher 126 pushes them onto the conveyor 130 and thereby completes the wrapping of packages by underfolding the leading film edge. While the package holddown 116 is elevated as shown in dashed lines in FIG. 2, the labeling head 116A is positioned adjacent to the outlet of the label conveying apparatus 119A to receive a printed price label for the next package to be wrapped. The packaging machine in accordance with the present invention is configured so that a price label is generated for the package being wrapped so that no delay or storage of price information is required to correlate prices with packages as in the prior art.

The package pusher 126 is mounted to the trolley bar 500 by a hinge 510. The hinge 510 permits the package pusher 126 to be elevated together with the rear underfolder 122 to remove jammed packages from the machine. Lifter blocks 512 are provided on either side of the pusher 126 to prevent the pusher 126 from jamming against or impeding the upward motion of the rear underfolder 122 as it is lifted. The lifter blocks 512 also serve to lift the pusher 126 by contact with the rear underfolder 122 as the underfolder is lifted.

The package sealing holddown 134 comprises side members 530 which are rigidly interconnected by a web 532 and a cylindrical rod 534 to form a generally rectangular framework, see FIG. 9. The side members 530 are mounted for free pivotal movement about a rotatable cylindrical shaft 536. The shaft 536 is driven by the belt 462 which engages a pulley 538 firmly affixed to the shaft 536 (see also FIGS. 8, 16 and 17). The shaft 536 is mounted for rotation in side frame members 540 which are affixed to the sides of the machine through spacers 542.

A generally cylindrical holddown roller 544 comprises a central section 544A of a first diameter and two outer sections 544B connected to the central section 544A by frustum sections 544C. The generally cylindrical roller 544 is mounted for rotation between the side members 530 and is driven by a plurality of belts 546 from a multiply grooved pulley 548 which is firmly affixed to the shaft 536. The central section 544A of the generally cylindrical roller 544 includes a plurality of grooves for receiving the belts 546. In the illustrative embodiment, the belts 546 have a generally circular cross-section; however, other shapes of drive belts can be incorporated into the sealing holddown 134. The pulley 548 is driven in a counter-clockwise direction as viewed from the right side of the machine, as shown in FIG. 1, by the belt 462 to assist the sealer/conveyor apparatus 132 in conveying wrapped packages from the machine (see FIG. 16).

FIGS. 14 and 15 show different width and height packages passing between the sealing/conveying apparatus 132 and the package holddown roller 544. The sealing holddown 134 maintains a force against the top of a package passing across the sealing/conveying apparatus 132 and is rotated by the belts 546 in a direction to complement the conveying action of the sealing/conveying apparatus 132. The sealing holddown 134 is pivotally mounted as previously described so that the holddown can move upwardly as packages pass thereunder. A roller (not shown) comparable to the roller 470 for the conveyor 130 may be mounted within the belts 546 to support the lower portions thereof if the belts are deformed by packages exiting the machine.

The shape of the holddown roller 544 has been found to provide improved sealing contact between wrapped packages and the sealing/conveying apparatus 132. In particular, for thin packages, e.g., steaks or other slices of meat, the outer sections 544B of the roller concentrate the holddown force toward the outer side edges of the tray and may even rest against the upper tray edges, see FIG. 14. Thus, the force is concentrated upon the outer fringe portions of the tray where the majority of the film fold is accumulated and the film fold is then compacted and sealed. For higher packages where such force application cannot be obtained, the roller 544 tends to spread the force laterally across the package and still ensure proper heat sealing of wrapped packages. It is noted that higher packages tend to have more weight and, hence, the force provided by the sealing holddown is less important.

Where the roller 544 actually contacts the upper surface of wrapped packages, an additional application force is provided for adhering price labels to packages. In the event such additional force is required due to the type of label selected for use in the present invention, the central section 544A of the roller 544 can be enlarged to ensure contact and, hence, additional label application force.

Figure 16:
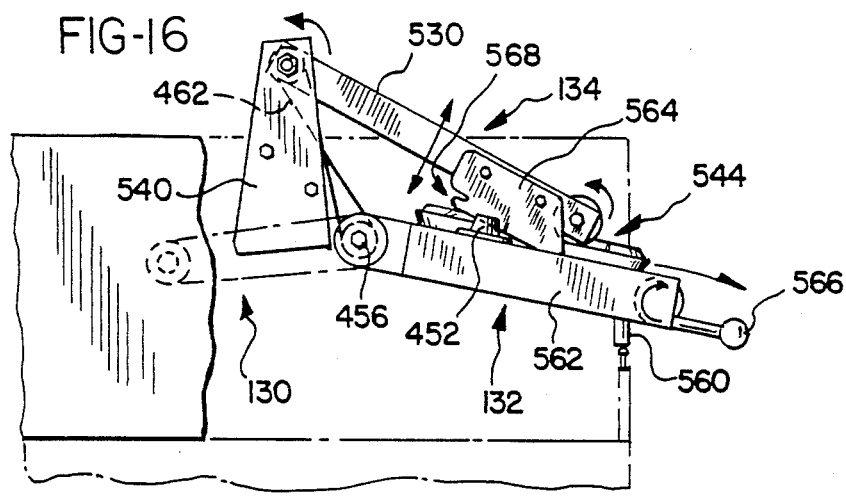
FIGS. 16 and 17 show the cooperative construction of the package holddown and exit conveyor of the machine (see drawing sheet 13).
Figure 17:
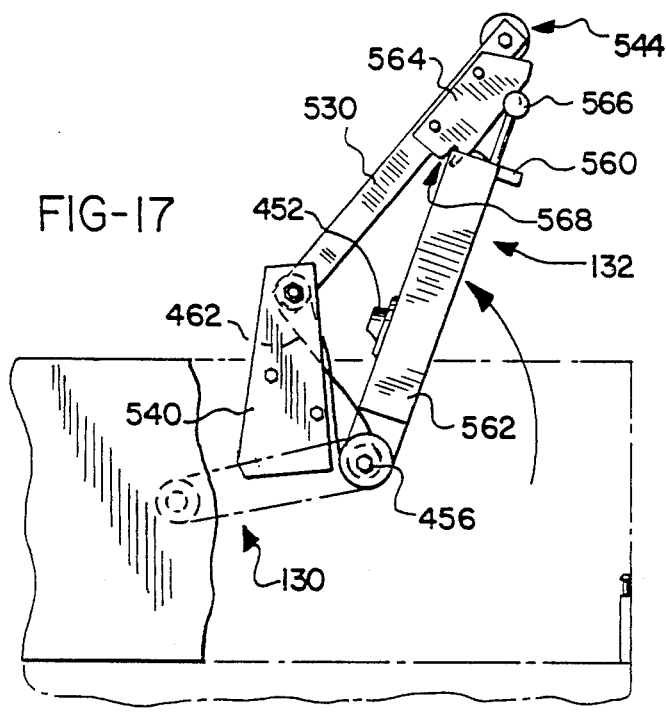

The interrelationship between the sealing/conveying apparatus 132 and the sealing holddown 134 is shown in FIGS. 16 and 17. When in the machine operating, package conveying position, the sealing/conveying apparatus 132 is supported on the wrapping machine frame by an extension 560. In turn, the package sealing holddown 134 is supported on housings 562 by side plates 564 which are constructed from trifluoroethylene, nylon or a similar material.

The film feeding apparatus is oriented generally below the conveyor 130. To make the film feeding apparatus conveniently accessible to an operator for threading film through film feeding jaws 340 and 342 as previously described with reference to FIGS. 11 and 12, the sealing/conveying apparatus 132 is pivoted upwardly by manually lifting a handle 566. The side plates 564 of the sealing holddown 134 are formed to ride against the housings 562 of the sealing/conveying apparatus 132 as that apparatus is pivotally raised from the position shown in FIG. 16 to the position shown in FIG. 17.

A notch 568 is provided in each of the side plates 564 to engage the edges of the housings 562 when the sealing/conveying apparatus 132 is placed into its fully elevated position as shown in FIG. 16. This maintains the sealing/conveying apparatus 132 and the sealing holddown 134 in an elevated position out of the operator's way to provide free access to the film feeding apparatus.

To return the sealing/conveying apparatus 132 and the sealing holddown 134 to the position shown in FIG. 16, a force is applied to the handle 566 to remove the edges of the housings 562 from the notches 568. The sealing holddown 134 is then manually moved away from the sealing/conveying apparatus 132 which is then lowered to a position just below where the edge of the housings 562 will engage the notches 568. At that point, the side plates 564 of the package sealing holddown 134 can again be placed against the sealing/conveying apparatus 132 and both lowered to the position shown in FIG. 16.

V. Microprocessor Control System

Figure 20:
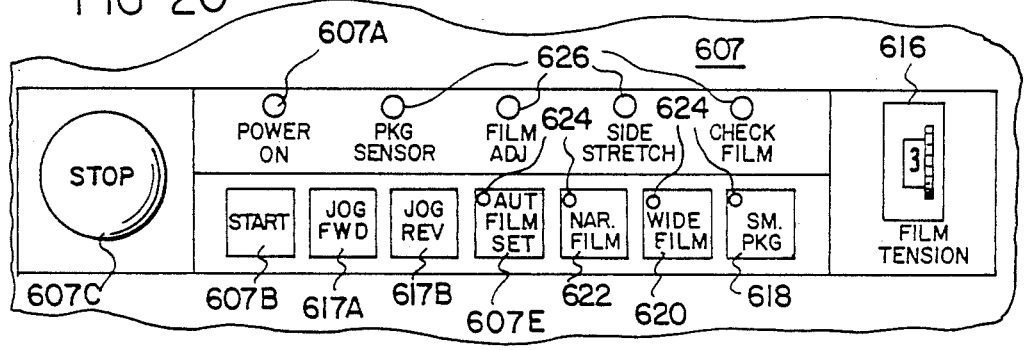
FIG. 20 shows the control panel for the disclosed stretch film wrapping machine (see drawing sheet 12).
Figure 18:
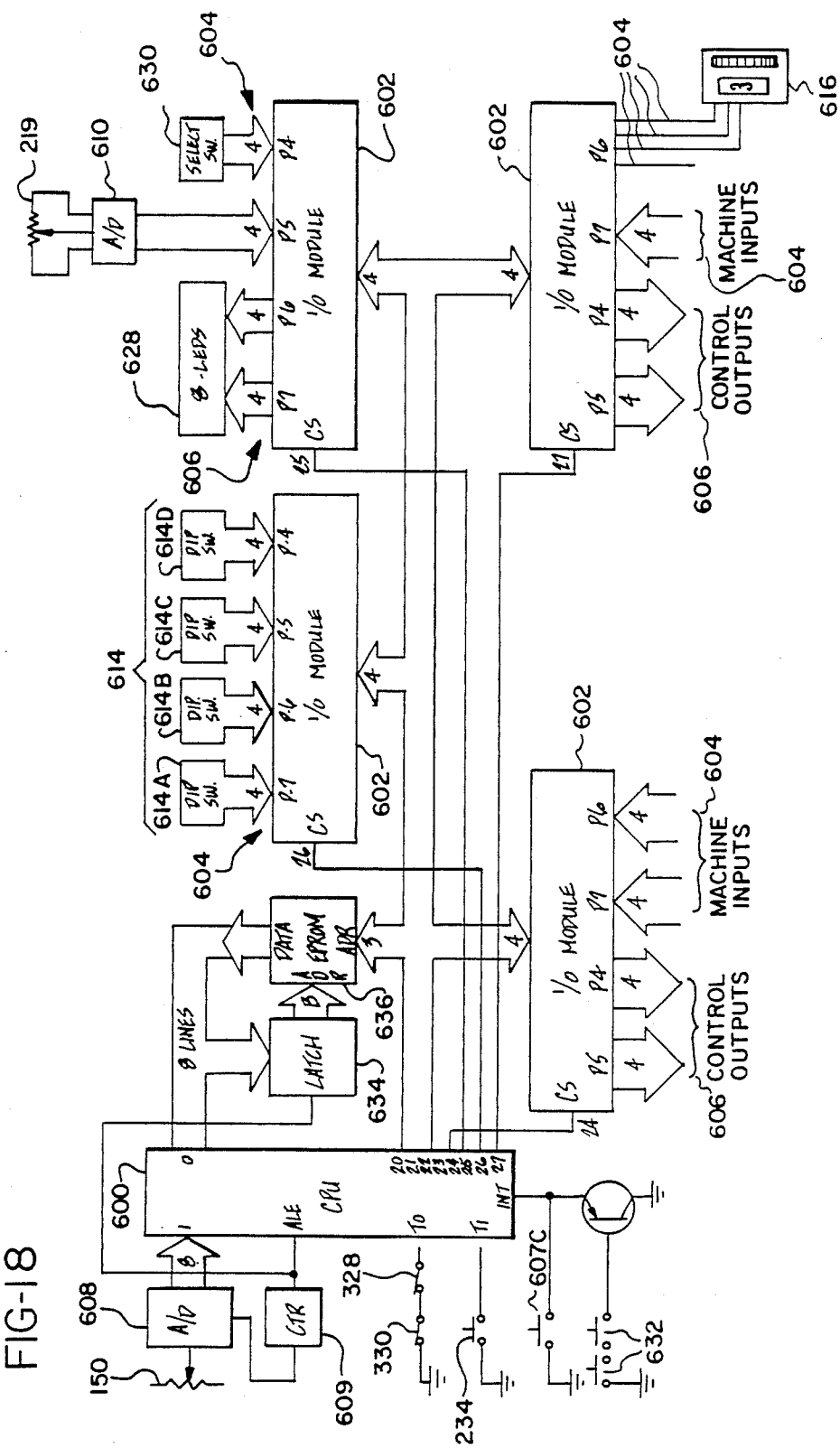
FIG. 18 is a block diagram of the microprocessor control system of the disclosed packaging machine (see drawing sheet 14).

The mechanical operation of the packaging machine is controlled by the main drive shaft 140 which drives the four control cams 144, 161, 173, 200 and the various chain drives previously described. With reference to FIGS. 18 through 20, the electrical operation of the wrapping portion of the packaging machine is controlled by a microprocessor 600 and associated input-/output (I/O) modules 602 which monitor and control electrical devices of the machine in synchronism with the main drive shaft 140. Input signals to the microprocessor 600 are received on inputs 604 of the I/O modules 602 and output display and control signals are generated on outputs 606 of the I/O modules 602.

The packaging machine is controlled and monitored by an operator through control panels 605 and 607 as shown in FIGS. 1 and 20. Various switches and displays, although to some extent self-explanatory due to functional labelling, will be referred to and explained as the control system is described. The control panel 605 is essentially an information input keyboard and display for a computer controlled scale/labeler. A variety of such systems are well known in the prior art with commodity identification, price per unit weight, tare weight, inventory control and security identifications being typical information which is stored into memory of the scale/labeler computer. The information is usually stored into individual files of records which correspond to commodities to be wrapped and can be recalled by entering an abreviated commodity identification code.

When the machine is powered up, "power on" display 607A is lighted by a transformer (not shown). To start the machine, a start switch 607B is depressed and to stop the machine an easily accessible, oversized stop switch 607C is depressed. Activation of the stop switch 607C also provides for emergency stops of the machine by stopping the machine within a minimum period of time.

Electrical/mechanical coordination is accomplished by the generation of system clock signals from the output signal of the potentiometer 150 which is driven from the main drive shaft 140. The potentiometer 150 generates an analog voltage signal the magnitude of which directly corresponds to the angular orientation of the main drive shaft 140. Hence, the physical orientation of the various machine components are defined by the analog voltage signal throughout each operating cycle of the machine.

The analog voltage signal from the potentiometer 150 is converted into binary coded clock counts by a eight bit analog-to-digital (A/D) converter 608 (see FIG. 18). The A/D converter 608 is driven from the clock of the microprocessor 600 through a divider or counter circuit 609. The eight bit clock counts generated by the A/D converter 604 define 256 distinct operating points for each machine cycle. The clock counts are monitored by the microprocessor 600 to perform required electrical operations upon the occurrence of specific clock counts.

Operation of the microprocessor control system of the wrapping portion of the packaging machine can best be understood by referring to the system timing diagram shown in FIG. 19. Clock counts generated by the A/D converter 608 are shown across the top of the system timing diagram. The clock counts and, hence, the operations of the microprocessor control system are synchronized with the mechanical operation of the wrapping portion of the machine by setting the clock count of 168 as the point when the package pusher 104 engages a package positioned at the rear-most end 102A of the feed-in tray 102 as shown in FIG. 1.

For a package to be wrapped, a clock count of 194 must be received by the microprocessor 600. Upon receipt of the 194 clock count, the microprocessor 600 initiates sensing of the length and width characteristics of a package to be wrapped by enabling the package sensing operation. If an autofilm set switch 607E is operated, the machine automatically selects the width and length of film to be used to wrap each package based on the sensed package length and width characteristics, the weight of the package and the known commodity being wrapped.

During the period of clock counts between and including 194 to 232, the output signal from the switch operated by the plate 230 is monitored through an input T1 of the microprocessor 600 to sense whether a package is present and, if present, the length of the package. By reading the clock count when the plate 230 is contacted by an incoming package, the package length is determined. The earlier the plate 230 is contacted, the longer the package. If no package is sensed, film will not be drawn into the machine for that machine cycle.

Four package lengths or length ranges have been empirically defined for the disclosed packaging machine: D (longest packages) is defined by contact with the plate 230 between and including clock counts of 194 to 205; C, between and including clock counts of 206 to 210; B, between and including clock counts of 211 to 219; and A (shortest packages) between and including clock counts of 220 to 232. Even though a continuous film length selection is possible within the limits of the mechanism shown in FIGS. 4 and 5, four distinct film length settings essentially corresponding to the four defined package lengths A-D have been chosen for use in the packaging machine.

The four film lengths have been found to be satisfactory for wrapping a large variety of package sizes. By utilizing four differing film lengths, the film is efficiently used by the packaging machine while the number of necessary adjustments of the film length selection mechanism shown in FIGS. 4 and 5 is reduced to provide longer life.

The packaging machine is stopped if oversized packages are fed into it. Such oversized packages could potentially lead to jamming and/or contamination of the machine. An oversized package is indicated by package contact with the plate 230 prior to a clock count of 194, in which event the machine is stopped prior to the elevation of the elevator 108. The machine stop is performed at a clock count of 90 which ensures that the elevator 108 is not appreciably raised prior to machine shutdown. The elevator 108 is in the down position between clock counts of approximately 28 to 126.

At a clock count of 228, a wide package test is performed. A wide package is defined as a package approximately nine (9) inches in width or wider, of course, the definition of a wide package is adjustable in the disclosed machine. A wide package is indicated if both Hall effect switches 226 are activated by deflections of the swing arms 222 by a package entering the wrapping machine. Both switches must be activated since an operator may place a package off-center so that one of the switches 226 may be operated by a narrow package.

If a wide package is sensed, wide film from the roll 322 will be selected at a clock count of 240 by operating the solenoid 396 as previously described. Once a film width has been selected, that width film continues to be provided to the wrapping machine until the other film width is required in accordance with the characteristics of a sensed package.

The package is transported across the weighing conveyor 105 approximately between clock counts of 240 and 40. Preferably, the weight of the package is determined during this transportation period. However, in accordance with the present invention, the weighing conveyor could be stopped for the weighing operation. Such stop and go operation would require proper synchronization between the weighing conveyor 105 and the platforms 106 as will be apparent to those skilled in the art. Also, alternate weighing and conveying arrangements can be utilized in the invention. For example, an indexing conveyor and scale comparable to the arrangement disclosed in previously referenced U.S. Pat. No. 3,878,909 could be used to replace the weighing conveyor 105. In any event, signals representative of the package weight are passed to the labeler 119 so that a price can be calculated and a price label printed.

The length and width signals together with the commodity being packaged are used to identify or predetermine a weight corresponding to the commodity being packaged and the size of the tray supporting the commodity. If the predetermined weight is exceeded, the package is treated as a high package since increased weight can only be attributed to height when a commodity is supported upon a tray and substantially covers the supporting surface of the tray, as is the case in practical applications.

If a high package is detected, the next longer film increment, i.e., the next longer package size is indicated with the exception that if the minimum film length was initially indicated, the minimum film length will still be used. Of course, if the maximum film length was initially indicated, no adjustment will be made beyond that maximum film length which is used to wrap the package. For selected narrow packages which are also detected to be high, wide film may be selected in addition to the film length increment.

At the next clock count following a stable weight signal from the weighing conveyor 105, the microprocessor 600 determines what film width and length is to be used to wrap the package that was just sensed. Film lengths are determined by the sensed package length with the shortest of the four film lengths being drawn for an A package and incremental increases for B, C and D packages. Also, as previously noted, if a high package has been determined by the combination of the package weight and tray dimensions, the next longer film length will be drawn unless the minimum or maximum film length was indicated.

Once the film length to be used is determined, the present setting of the film length selection mechanism shown in FIGS. 4 and 5 is read from the linear potentiometer 219. If the desired film length and the present setting are the same, no adjustment is necessary; however, if the two are different, the film length selection mechanism must be adjusted to pull the desired length of film.

The linear potentiometer 219 generates an analog output signal which is directly proportional to the positioning of the lower end of the link 209 along the arcuate slot 211. The analog output signal of the linear potentiometer 219 is converted into a four bit binary code by an A/D converter 610 (see FIG. 18). This four bit code defines sixteen different film lengths which could be selected by the microprocessor 600 of the electrical control system for the disclosed packaging machine. As previously noted, in the disclosed embodiment only four of the available sixteen film lengths are selected. These four film lengths are the same for both of the two different film widths. It is noted that all sixteen film lengths could be selected if desired and also additional lengths could be defined by the use of an analog-to-digital converter having greater than a four bit output signal.

If an adjustment of the film length selection mechanism is necessary, the disc brake 218 which normally locks the screw shaft 215 in an adjusted position, is released; and, if the film length to be drawn is less than the present setting of the film length selection mechanism, a motor reversing relay (not shown) is operated to precondition the motor 216 to operate in the proper direction for the required adjustment.

Due to the potentiometer 150 design there is a time lapse after a clock count of 255 until a zero clock count is generated. During this time lapse the jam test, as will be described, is not performed since a jam condition could be indicated. Fixed clock counts defining points at which operations are to be performed or which are used to calculate such points are also read into the memory of the microprocessor during this time lapse. Reestablishment of these fixed clock counts for each machine cycle ensures their availability and accuracy in the event that they had been inadvertently deleted or altered during the preceding packaging machine cycle.

At a clock count of 16, the jam test is initiated. The jam test is performed by monitoring the clock counts during each operating cycle of the microprocessor 600. The microprocessor operating cycle is short compared to the time (approximately 7 milliseconds) between consecutive clock counts. Monitoring of the clock counts is performed by incrementing an eight (8) bit jam counter for each microprocessor operating cycle and clearing the jam counter for each change of the clock count. The jam counter is maintained within the microprocessor 600 and, hence, is not physically shown in FIG. 18. During smooth operating portions of the film wrapping machine cycle, a count of approximately fourteen microprocessor operating cycles can be anticipated between consecutive clock counts.

A jam condition is indicated if the jam counter overflows as the result of the main drive shaft 140 hesitating for a sufficient period of time. When the motion of the main drive shaft 140 is thus delayed, the position of the potentiometer 150 is similarly delayed and the corresponding clock count does not change, which permits the count in the jam counter to accumulate. Upon the detection of a jam condition, power to the machine motor is interrupted. The jam test is disabled between clock counts of 255 and 0 since the "blank portion" of the potentiometer 150 occurring between these counts could be indicated as a machine jam.

The tension of the film on wrapped packages is controlled by setting the operate and release times of the film side clamps 114 and the release times of the film gripper 110 in synchronism with or in phased relation to the underfolders 122, 124. In the microprocessor control system used in the disclosed packaging machine, the operate and release times of the film side clamps 114 correspond to the film width selected and the release times of the film gripper 110 correspond to the film width and length selected.

The operate time of the film gripper 110 is the same regardless of the film width or length since the film gripper 110 must always operate when it is in the film end engaging position 112 as shown in phantom view in FIG. 7. Hence, whenever film is drawn into the machine, the film gripper 110 is operated at a clock count of 43 regardless of the length or width of the film to be drawn.

The film side clamps 114 are operated at set clock counts of 134 for narrow film and 146 for wide film. Operation of the film side clamps 114 at a clock count of 134 for the narrow film 320A provides for gripping narrow film when the side clamps are at their innermost position. By delaying operation of the side clamps 114 until a clock count of 146 for the wide film 322A, the side clamps 114 have started their outward movement. Thus, while the wide film 322A is gripped further in from the film side edges than the narrow film, the film clamps 114 are more widely separated from one another when the wide film is gripped. Of course, the exact points of application of the clamps 114 can be adjusted by changing the clock counts at which the clamps are activated.

It should be clear that the longer film is held by the side clamps 114 and the film gripper 110 as the underfolders 122 and 124 operate, the more the film is stretched about a package and, hence, the greater the tension of the film. The release of the side clamps 114 is set at a base clock count of 189 for narrow film and at a base clock count of 184 for wide film. The base clock counts for the release of the film gripper 110 depend upon both the film width selected and package size or film length for the package being wrapped. For narrow film, the base clock counts for gripper release are: D package, 193 clock count; C package, 194 clock count; B package, 195 clock count; and A package, 195 clock count. For wide film, the base clock counts for gripper release are as follows: D package, 185 clock count; C package, 192 clock count; B package, 194 clock count; and A package, 194 clock count.

At a clock count of 43, the actual release clock counts for the side film clamps 114 and the film gripper 110 are calculated from the defined base release clock counts. The actual release clock counts are calculated to permit compensation for mechanical changes which may occur due to wear and aging of the machine over its operating life. Such changes can effect the synchronization of the underfolders 122, 124 with the release times of the side clamps 114 and the film gripper 110. Also, the machine may be operated in a variety of ambient environmental conditions, such as varying temperature and humidity, and also a variety of film gauges may be used in the packaging machine.

Compensation for such aging and environmental conditions is provided in the disclosed packaging machine by adjusting the actual release clock counts for the side film clamps 114 and the film gripper 110 by up to plus or minus seven clock counts from the base clock counts. The adjustments are provided by means of adjustment switches 614. Four separate switches, 614A through 614D, are provided to adjust the release time individually for the release of the film clamps for wide film (614B); the release of the film gripper for wide film (614A); the release of the film clamps for narrow film (614D); and the release of the film gripper for narrow film (614C). In addition to the adjustment switches 614, a tension adjustment switch 616 is provided to adjust the base release clock counts of the film gripper 110 by from zero to plus seven clock counts.

The tension control switch 616 is a thumb wheel switch controlled by the operator of the machine. The setting of the switch 616 is used to calculate the gripper release clock counts for both narrow and wide film widths. The settings of the adjustment switches 614 are normally changed only infrequently due to aging or changed ambient conditions with changes typically being made during routine maintenance. Hence, the switches 614 are normally available only to maintenance service personnel and not to the machine operator.

For the side clamps 114, the actual release clock counts are calculated by combining the base release clock counts previously defined and the setting of the corresponding film clamp adjustment switch 614B or 614D. For the film gripper 110, the actual release clock count is calculated by combining the base clock counts previously defined with both the setting of the corresponding wide or narrow film gripper adjustment switch 614A or 614C and the setting of the tension control switch 616.

A package flag is maintained by the microprocessor 600. The package flag is cleared prior to each package sensing window (between and including clock counts of 194 to 232) and remains cleared if no package is sensed. If the package flag is cleared, no film is drawn into the packaging machine even though the mechanical operation of the machine continues. If a package is sensed during the package sensing window, the package flag is set. If the package flag is set, film is drawn into the machine to wrap the sensed package. The microprocessor 600 maintains a count of the number of consecutive packaging machine cycles during which the package flag remains cleared and the machine is stopped after a programmable number of operations, preferably seven (7) operations.

At a clock count of 50, an adjustment of the film length mechanism shown in FIGS. 4 and 5, if necessary, is initiated by energizing the motor 216. The direction of operation of the motor 216 was previously selected to precondition the adjustment. The linear potentiometer 219 is monitored while the motor 216 operates until the setting of the film length mechanism corresponds to the desired setting. When the setting indicated by the potentiometer 219 and the desired setting are equal, the motor 216 is turned off and the disc brake 218 is activated to secure the screw shaft 215 at the desired setting. Activation of the brake 218 prevents creeping of set adjustments of the film length selection mechanism as well as helping to prevent overshoot as adjustments are made. Limit switches (not shown) prevent the motor from trying to force the lower end of the link 209 beyond the ends of the arcuate slot 211.

The disclosed packaging machine can be incrementally operated or "jogged" in either a forward direction or in a reverse direction by operation of momentary contact switches 617A and 617B, respectively, see FIG. 20. Forward jog permits the machine to be operated through a complete packaging sequence to ensure the machine is properly set up before being operated at full speed. Operation by forward jogging does not provide a well wrapped package since machine inertia is required for smooth, actual wrapping performance and package weighing and labeling functions may also be disabled or disrupted by jogged operation. Reverse jog operation facilitates removal of jams from the machine.

Reverse jog can only be activated between machine clock counts of 8 and 211 inclusive. The limitation on reverse jog operation ensures that the machine is not operated in a reverse direction through the portion of mechanical operation where the underfolders 122, 124 fold down the spring loaded slats 108B of the elevator 108. Reverse operation through this portion of the machine cycle could cause damage to the machine. Each activation of one of the jog switches 617A or 617B, provides power to the main machine motor for a time period of one clock count. Although the power is provided for only one clock count, the machine moves through more than one clock count due to the mechanical inertia created by the pulsed activation of the motor.

Special provisions are made for "small packages" which are defined for the disclosed packaging machine as being approximately five (5) inches wide by five (5) inches long and below the predetermined weight which would indicate the package is a high package. When a small package switch 618 is activated, only narrow width film is provided to the wrapping machine, the film gripper 110 base release clock count is set to 206 and the side film clamps 114 base release clock count is set to 200. Calculation of the actual release times of the clamps 114 and the gripper 110 are as previously described, but with the modified base release clock counts.

The operator may also select either wide width film or narrow width film regardless of the film width which is indicated by the automatic system previously described. When a wide film switch 620 is activated, the film selector presents only wide film to the film gripper 110. The film length drawn is still determined by package sensing and detection of a high package again causes the next longer film length to be pulled, except for minimum or maximum lengths as previously described.

When a narrow film switch 622 is activated, only narrow film is presented to the film gripper 110. The film length drawn is still set in accordance with the package length sensed as previously described again with the exception that if a high package is detected, the next longest film length is pulled (unless minimun or maximum film length is indicated).

At a clock count of 92, the microprocessor 600 determines whether one of the film sensing switches 328 and 330 was opened due to film being drawn into the film wrapping machine. If no film was drawn, the machine is shut-down. This permits the unwrapped package to be removed from the machine and the film to be refilled or the film problem corrected without contamination to the machine which could occur if an uncovered package was moved through the wrapping station of the machine.

A machine stop at a clock count of 92 due to a film problem condition may facilitate threading a new roll of film into the machine in the event that the film has expired. Normally, when a roll of film expires, a short section of the trailing end of the film will remain threaded through the corresponding film feed-in jaws 340 or 342. This remaining section of film can be "adhered" to the leading end of the replacement roll of film either by natural adhesion between the two, by tape or otherwise. The new film can then be threaded through the film feeding jaws by pulling the remaining section of film through the jaws from inside the machine. After the film is pulled into the machine, straightened and secured within the corresponding film feeding jaws, the film is severed by manually activating the knife 120 via the handle 260. The machine is then ready to operate once again. Thus, the disclosed packaging machine provides two convenient and rapid techniques for threading a new roll of film into the wrapping machine.

The control panel 607 of FIG. 20 includes various displays 624 which lndicate the active film selection or operating mode of the machine. Other displays on the control panels 605 and 607 indicate operations being performed by the machine, weights and prices for individual packages. Operation of the microprocessor 600 can be monitored through a light emitting diode display panel 628, with the specific signal displayed being selected by a display function switch 630 (see FIG. 18). Cover panel interlock switches 632 stop the wrapping machine from being operated if the cover panels are not secured on the machine.

One successful embodiment of the microprocessor control system for the disclosed packaging machine has been constructed using the following components:

TABLE I

| | |
|---|---|
| 600 | MICROPROCESSOR, 8035 available from Intel Corporation |
| 602 | I/O MODULE, 8243 available from Intel Corporation |
| 608 | A/D CONVERTER, ADC 0800 available from National Semiconductor Corporation |
| 609 | COUNTER, 4027 available from Motorola Corporation |
| 610 | A/D CONVERTER, ADC 0803 available from National Semiconductor Corporation |
| 634 | I/O PORT, 8212 available from Intel Corporation |
| 636 | ERASABLE PROGRAMABLE READ ONLY MEMORY (EPROM), 2716 available from Intel Corporation |

FIG. 21 is a chart illustrating one example of film selection for a variety of tray sizes used to package meat. In this illustration, the rather broad definition of the commodity to be packaged as "meat" is satisfactory since meat varieties have sufficiently uniform densities so that given weights can be set for all meat products to be packaged in these size trays. For this illustrative algorithm, the dual switches 229, as shown in FIG. 10, would be utilized in the packaging machine so that narrow trays (widths less than 9 inches), mid-width trays (widths equal to approximately 9 inches) and wide trays (widths 10 inches and greater) can be detected.

In FIG. 21, the upper row of trays corresponds to tray sizes which will be ordinarily wrapped with narrow width film while the lower row of tray sizes will be wrapped with wide width film. If a high package is detected by the weight of a trayed commodity exceeding the defined weight given in the chart of FIG. 21, the length of film is incremented to correspond to the next greatest package size and in the case of the 9-inch wide tray, if that weight is exceeded indicating that a high package is present, wide film is selected in addition to the increment in film length.

The cooperative interaction between a scale, a wrapping machine and a labeling machine in accordance with the present invention will suggest many alternatives to those skilled in the art. For example, with the scale/labeler computer memory being available as an input to the computer of the wrapping machine, each of the commodities or commodity codes for a single commodity can include information defining the tray size and the film size to be used for that commodity. Such specification of the tray size and a corresponding film size can be coupled with the high package indication to once again increment the length and/or switch between narrow and wide films for wrapping selected sizes of given commodities. These alternate embodiments as well as other alterations and modifications of the disclosed system are considered within the spirit and scope of the present invention.

While the forms of apparatus herein described constitute preferred embodiments of this invention, it is to be understood that the invention is not limited to these precise forms of apparatus, and that changes may be made therein without departing from the scope of the invention which is defined in the appended claims.

What is claimed is:

1. In a packaging machine comprising a stretch wrap station adjacent a feed-in tray and having means for prestretching film within a horizontal plane across an elevator which is movable along a vertical elevation path intersecting with said horizontal plane wherein packages which are to be wrapped and priced are transported from said feed-in tray to said elevator which in turn elevates the packages into a prestretched section of stretch film to thereby wrap and further stretch said film about said package, the improvement comprising:
   weighing means for receiving packages to be wrapped and generating weight signals representative of the weights of said packages;
   label generating means responsive to said weight signals for producing pricing labels for said packages; and
   label handling means for conveying said labels to a position vertically above said elevator and to a position intersecting with said elevation path of said elevator whereby pricing labels are applied to said packages along the elevation path of said elevator.

2. The packaging machine of claim 1 wherein said weighing means comprises a weighing conveyor positioned between said feed-in tray and said elevator which further provides for transporting said packages to said elevator while weighing said packages.

3. The packaging machine of claim 1 wherein said packages comprise tray-supported commodities and said machine includes sensing means for determining the length and width of said tray-supported commodities entering said machine and further comprises control means for selecting the length and width of film to be used to wrap said tray-supported commodities in response to the sensed length, width and weight of said tray-supported commodities.

4. The packaging machine of claim 3 wherein said label generating means further calculates and compensates for the tare weight based on sensed tray dimensions.

5. In a packaging system comprising a film wrapping machine for wrapping known commodities supported upon trays of varying sizes in variously sized sheets of film, means for weighing trayed commodities and computation means for calculating the price to be charged for such trayed commodities based on the weights of the trayed commodities, the price per unit weight of the commodity and the tare weight, the improvement comprising:
   control means comprising sensing means for determining the dimensions of said trays and generating package signals representative of said dimensions; and
   said computation means comprising tare generating means coupled to said control means and responsive to said package signals for determining the tare weight to be used for calculating the price for said trayed commodities.

6. In apparatus for calculating the price of a trayed commodity based on the price per unit weight of the commodity, the weight of the trayed commodity and the tare weight, said apparatus comprising means for weighing the trayed commodity and means for calculating the price of the trayed commodity, the improvement comprising:
   sensing means for determining the base dimensions of the tray supporting said trayed commodity and for generating package signals representative thereof; and
   tare weight generating means for determining the tare weight in response to said package signals.

7. Apparatus for selecting the size of a sheet of wrapping material to be used for wrapping a known commodity supported upon a generally rectangular tray, said commodity substantially covering the entire surface of said tray, said apparatus comprising:
   means for determining the base dimensions of said tray and for generating tray signals representative thereof;
   scale means for determining the weight of said trayed commodity and for generating weight signals representative thereof;
   computer control means responsive to said tray signals and said weight signals for ascertaining whether said trayed commodity weighs more than a predetermined weight which corresponds to a defined height of said known commodity supported upon a tray of the determined base dimensions of said tray;
   a supply of wrapping material wider than said trayed commodity with a leading edge thereof positioned at a defined material drawing location; and
   gripper means for drawing the leading edge of said wrapping material to a first location determined in accordance with said determined tray dimensions if the weight of said trayed commodity does not exceed said predetermined weight and to a second location a defined distance beyond said first location if the weight of said trayed commodity exceeds said predetermined weight to indicate that the height of said trayed commodity exceeds said defined height.

* * * * *

UNITED STATES PATENT AND TRADEMARK OFFICE
CERTIFICATE OF CORRECTION

PATENT NO. : 4,543,766

DATED : October 1, 1985

INVENTOR(S) : Edwin E. Boshinski

It is certified that error appears in the above-identified patent and that said Letters Patent are hereby corrected as shown below:

The Abstract should include a final sentence which reads --The package weight is determined by subtracting a tare weight based on sensed package dimensions from the gross weight of the package to arrive at an accurate net pricing weight.--.

Column 13, line 52, "32" should read --132--.

Column 14, line 3, "24" should read --124--.

Column 17, line 32, "of" should read --or--.

Signed and Sealed this

First Day of July 1986

[SEAL]

Attest:

DONALD J. QUIGG

Attesting Officer

Commissioner of Patents and Trademarks